United States Patent
Wirola et al.

(10) Patent No.: US 11,480,652 B2
(45) Date of Patent: Oct. 25, 2022

(54) SERVICE FOR REAL-TIME SPOOFING/JAMMING/MEACONING WARNING

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 16/723,451

(22) Filed: Dec. 20, 2019

(65) Prior Publication Data
US 2020/0200864 A1    Jun. 25, 2020

(30) Foreign Application Priority Data

Dec. 20, 2018 (EP) .................... 18214724

(51) Int. Cl.
*G01S 7/02* (2006.01)
*G01S 13/08* (2006.01)
*G06F 9/54* (2006.01)

(52) U.S. Cl.
CPC ............ *G01S 7/021* (2013.01); *G01S 13/08* (2013.01); *G06F 9/542* (2013.01)

(58) Field of Classification Search
CPC .......... G01S 7/021; G01S 13/08; G06F 9/542
See application file for complete search history.

(56) References Cited

U.S. PATENT DOCUMENTS 6,049,333 A * 4/2000 LaJoie ............... H04N 5/44543
                                                  715/718
6,448,925 B1   9/2002 Shridhara
(Continued)

FOREIGN PATENT DOCUMENTS

CN     106597363 A    4/2017
EP     2 746 813 A1   6/2014
(Continued)

OTHER PUBLICATIONS

Extended European Search Report for Application No. EP 18 21 4716 dated Jul. 5, 2019, 6 pages.
(Continued)

*Primary Examiner* — Franklin D Balseca
(74) *Attorney, Agent, or Firm* — Alston & Bird LLP

(57) ABSTRACT

A method is disclosed that includes obtaining one or more pieces of threat information indicative of a data set enabling positioning based on radio signals sent by a respective radio node. The data set is further indicative of one or more parameters based on which said positioning is performed and/or controlled and which is considered to be at least partially unexpected. The method also includes utilizing the one or more pieces of threat information in a positioning. In order to obtain the one or more pieces of threat information, the method includes at least one of: obtaining the one or more pieces of threat information by using an application programming interface; or obtaining the one or more pieces of spoofing information by using a push method. A corresponding apparatus, computer-readable storage medium and system are also disclosed.

20 Claims, 6 Drawing Sheets

(56) References Cited

U.S. PATENT DOCUMENTS

| | | | |
|---|---|---|---|
| 6,501,956 B1* | 12/2002 | Weeren | H04L 67/04 |
| | | | 455/463 |
| 7,305,232 B2 | 12/2007 | Ono et al. | |
| 7,312,752 B2 | 12/2007 | Smith et al. | |
| 7,574,202 B1 | 8/2009 | Tsao et al. | |
| 7,716,740 B2 | 5/2010 | Robert et al. | |
| 7,788,382 B1* | 8/2010 | Jones | H04L 69/14 |
| | | | 709/227 |
| 7,859,462 B2 | 12/2010 | Small | |
| 7,970,894 B1 | 6/2011 | Patwardhan | |
| 8,571,578 B1 | 10/2013 | Chen et al. | |
| 8,655,312 B2 | 2/2014 | Stahlberg et al. | |
| 8,750,267 B2 | 6/2014 | Aggarwal et al. | |
| 8,805,403 B2 | 8/2014 | Curticapean et al. | |
| 9,113,291 B2 | 8/2015 | Venkatraman et al. | |
| 9,167,386 B2 | 10/2015 | Valaee et al. | |
| 9,258,713 B2 | 2/2016 | Rangarajan et al. | |
| 9,301,100 B1 | 3/2016 | Jampani et al. | |
| 9,374,709 B2 | 6/2016 | Peirce et al. | |
| 9,420,430 B2 | 8/2016 | Wuoti et al. | |
| 9,466,881 B1 | 10/2016 | Berry et al. | |
| 9,503,864 B1 | 11/2016 | Chao et al. | |
| 9,544,798 B1 | 1/2017 | Ahmadzadeh et al. | |
| 9,794,753 B1 | 10/2017 | Stitt et al. | |
| 9,849,978 B1 | 12/2017 | Carmack et al. | |
| 9,867,039 B2 | 1/2018 | Wang et al. | |
| 9,886,850 B2 | 2/2018 | Benhammou | |
| 10,149,159 B1 | 12/2018 | Perfitt | |
| 10,382,890 B1* | 8/2019 | Stirling | H04L 67/2842 |
| 10,511,392 B2 | 12/2019 | Khalajmehrabadi et al. | |
| 10,530,486 B2* | 1/2020 | Aoyama | G06F 3/04883 |
| 10,531,423 B1 | 1/2020 | Hassan et al. | |
| 10,841,746 B2* | 11/2020 | Eashwaramoorthy | H04W 4/80 |
| 2005/0041634 A1 | 2/2005 | Aura | |
| 2006/0240840 A1 | 10/2006 | Morgan et al. | |
| 2007/0049323 A1 | 3/2007 | Wang et al. | |
| 2007/0198835 A1 | 8/2007 | Mudhar | |
| 2009/0075630 A1 | 3/2009 | McLean | |
| 2009/0088132 A1 | 4/2009 | Politowicz | |
| 2010/0120422 A1 | 5/2010 | Cheung et al. | |
| 2011/0009132 A1 | 1/2011 | Skarby et al. | |
| 2011/0065450 A1 | 3/2011 | Kazmi | |
| 2011/0131651 A1 | 6/2011 | Shanmugavadivel et al. | |
| 2011/0154050 A1 | 6/2011 | Cordery et al. | |
| 2012/0056785 A1 | 3/2012 | Jovicic et al. | |
| 2013/0196684 A1 | 3/2013 | Dong | |
| 2013/0170378 A1 | 7/2013 | Ray et al. | |
| 2013/0252631 A1 | 9/2013 | Alizadeh-Shabdiz et al. | |
| 2013/0303185 A1 | 11/2013 | Kim et al. | |
| 2013/0310066 A1 | 11/2013 | Shu et al. | |
| 2013/0310068 A1* | 11/2013 | Fischer | G01S 19/05 |
| | | | 455/456.1 |
| 2013/0336138 A1 | 12/2013 | Venkatraman et al. | |
| 2014/0130155 A1 | 5/2014 | An et al. | |
| 2014/0150049 A1 | 5/2014 | Kwon et al. | |
| 2014/0256348 A1 | 9/2014 | Wirola et al. | |
| 2014/0259047 A1 | 9/2014 | Bakar et al. | |
| 2014/0344946 A1 | 11/2014 | Ward et al. | |
| 2015/0050947 A1 | 2/2015 | Wirola et al. | |
| 2015/0065166 A1 | 3/2015 | Ward et al. | |
| 2015/0172289 A1 | 6/2015 | Kwon et al. | |
| 2015/0215762 A1 | 7/2015 | Edge | |
| 2015/0226858 A1 | 8/2015 | Leibner et al. | |
| 2015/0247916 A1 | 9/2015 | Bartov et al. | |
| 2015/0257179 A1 | 9/2015 | Kim et al. | |
| 2015/0334676 A1 | 11/2015 | Hart et al. | |
| 2015/0351017 A1 | 12/2015 | Wirola et al. | |
| 2015/0381740 A1 | 12/2015 | Gwin et al. | |
| 2016/0054427 A1 | 2/2016 | Wirola et al. | |
| 2016/0066154 A1 | 3/2016 | Shin | |
| 2016/0094947 A1 | 3/2016 | Shen et al. | |
| 2016/0192136 A1 | 6/2016 | Pan et al. | |
| 2016/0260059 A1 | 9/2016 | Beniamin et al. | |
| 2016/0374046 A1 | 12/2016 | Wirola et al. | |
| 2017/0026806 A1 | 1/2017 | Jampani et al. | |
| 2017/0068902 A1 | 3/2017 | Kirshner | |
| 2017/0078851 A1 | 3/2017 | Agrawal et al. | |
| 2017/0103489 A1 | 4/2017 | Asad et al. | |
| 2017/0142684 A1 | 5/2017 | Bhatt et al. | |
| 2017/0160375 A1 | 6/2017 | Syrjarinne et al. | |
| 2017/0238146 A1* | 8/2017 | Kulig | H04W 4/029 |
| | | | 455/456.1 |
| 2017/0311165 A1 | 10/2017 | Kang et al. | |
| 2017/0325070 A1 | 11/2017 | Wirola et al. | |
| 2017/0343639 A1 | 11/2017 | Ivanov et al. | |
| 2017/0343640 A1 | 11/2017 | Khan et al. | |
| 2018/0007067 A1 | 1/2018 | Kaushik | |
| 2018/0067187 A1 | 3/2018 | Oh et al. | |
| 2018/0070239 A1 | 3/2018 | Norrman et al. | |
| 2018/0113189 A1 | 4/2018 | Khan et al. | |
| 2018/0123708 A1 | 5/2018 | Khalajmehrabadi et al. | |
| 2018/0188348 A1 | 7/2018 | Wirola et al. | |
| 2018/0219869 A1 | 8/2018 | Kumar et al. | |
| 2018/0255430 A1 | 9/2018 | Ivanov et al. | |
| 2018/0279067 A1 | 9/2018 | Ivanov et al. | |
| 2018/0332558 A1 | 11/2018 | Chan et al. | |
| 2018/0352585 A1 | 12/2018 | Yang et al. | |
| 2019/0036951 A1 | 1/2019 | Kim | |
| 2019/0150001 A1 | 5/2019 | Jen et al. | |
| 2019/0174452 A1 | 6/2019 | Lev et al. | |
| 2019/0340363 A1 | 11/2019 | Walrant | |
| 2020/0015096 A1 | 1/2020 | Wirola et al. | |
| 2020/0036590 A1 | 1/2020 | Camarillo Gonzalez et al. | |
| 2020/0112570 A1 | 4/2020 | Yang et al. | |
| 2020/0200856 A1 | 6/2020 | Wirola et al. | |
| 2020/0200857 A1 | 6/2020 | Wirola et al. | |
| 2020/0200858 A1 | 6/2020 | Wirola et al. | |
| 2020/0200859 A1 | 6/2020 | Wirola et al. | |
| 2020/0200865 A1 | 6/2020 | Wirola et al. | |
| 2020/0204988 A1 | 6/2020 | Wirola et al. | |
| 2020/0205004 A1 | 6/2020 | Wirola et al. | |
| 2020/0205005 A1 | 6/2020 | Wirola et al. | |

FOREIGN PATENT DOCUMENTS

| | | | |
|---|---|---|---|
| EP | 3 076 582 A1 | 10/2016 | |
| EP | 3 410 156 A1 | 12/2018 | |
| WO | WO 2015/189161 A1 | 12/2015 | |
| WO | WO 2017/100686 A1 | 6/2017 | |
| WO | WO-2017100686 A1 * | 6/2017 | H04W 4/90 |

OTHER PUBLICATIONS

Extended European Search Report for Application No. EP 18 21 4721 dated Jul. 22, 2019, 7 pages.
Extended European Search Report for Application No. EP 18 21 4705 dated Jul. 5, 2019, 8 pages.
Extended European Search Report for Application No. EP 18 21 4688 dated Jul. 9, 2019, 6 pages.
Extended European Search Report for Application No. EP 18 21 4718 dated Jun. 17, 2019, 9 pages.
Extended European Search Report for Application No. EP 18 21 4720 dated Jul. 15, 2019, 8 pages.
Extended European Search Report for Application No. EP 18 21 4694 dated Jul. 5, 2019, 6 pages.
Extended European Search Report for Application No. EP 18 21 4724 dated Jul. 12, 2019, 9 pages.
U.S. Appl. No. 16/721,311, filed Dec. 19, 2019; In re: Wirola et al. entitled *Enabling Flexible Provision of Signature Data of Position Data Representing an Estimated Position*.
U.S. Appl. No. 16/723,572, filed Dec. 20, 2019; In re: Wirola et al. entitled *Statistical Analysis of Mismatches for Spoofing Detection*.
U.S. Appl. No. 16/723,620, filed Dec. 20, 2019; In re: Wirola et al. entitled *Crowd-Sourcing of Potentially Manipulated Radio Signals and/or Radio Signal Parameters*.
U.S. Appl. No. 16/723,662, filed Dec. 20, 2019; In re: Wirola et al. entitled *Device-Centric Learning of Manipulated Positioning*.
U.S. Appl. No. 16/723,768, filed Dec. 20, 2019; In re: Wirola et al. entitled *Identifying Potentially Manipulated Radio Signals and/or Radio Signal Parameters Based on Radio Map Information and a Second Radio Map Information*.

(56) References Cited

OTHER PUBLICATIONS

U.S. Appl. No. 16/723,802, filed Dec. 20, 2019; In re: Wirola et al., entitled *Identifying Potentially Manipulated Radio Signals and/or Radio Signal Parameters Based on Radio Map Information*.

U.S. Appl. No. 16/723,802, filed Dec. 20, 2019; In re: Wirola et al. entiteld *Identifying Potentially Manipulated Radio Signals and/or Radio Signal Parameters*.

GPS Spoofing A Growing Problem For Uber [online] [retrieved Feb. 17, 2020], Retrieved via the Internet: https:/soliddriver.com/GPS-Spoofing-A-Growing-Problem-for-Uber (dated Nov. 10, 2019) 4 pages.

Galileo Commercial Service Implementing Decision enters into force Uber [online] [retrieved Feb. 17, 2020], Retrieved via the Internet: https:/www.gsa.europa.eu/newsroom/news/galileo-commercial-service-implementing-decision-enters-force (dated Feb. 10, 2017) 6 pages.

Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.

Android key store system 1 Android Developers [online] [retrieved Feb. 17, 2020], : Retrieved via the Internet: https://web.archive.org/web/20181212204557/https://developer.android.com/training/articles/keystore (dated Dec. 12, 2018) 17 pages.

Subscriber Identity Module—Wikipedia [online] [retrieved Feb. 17, 2020]. Retrieved via the Internet: https://web.archive.org/web/2017092316223/https://fi.wikipedia.org/wiki/Subscriber_Identity_Module (dated Sep. 23, 2017) 2 pages.

Extensible Authentication Protocol—Wikipedia [online] [retrieved Feb. 17, 2020], Retrieved via the Internet: https://web.archive.org/web/20171209152957/https://en.wikipedia.org/wiki/Extensible_Authentication_Protocol (dated Dec. 9, 2017) 10 pages.

Arkko, J. et al., *Extensible Authentication Protocol Method for 3rd Generation Authentication and Key Agreement* (EAP-AKA), RFC4187 (Jan. 2006) 80 pages.

Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.

Enierprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco/com/c/en/us/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.

Office Action for U.S. Appl. No. 16/723,802 dated May 18, 2020.

Final Office Action for U.S. Appl. No. 16/723,802 dated Sep. 2, 2020, 18 pages.

Office Action for U.S. Appl. No. 16/723,662 dated Jul. 9, 2020.

Office Action for U.S. Appl. No. 16/723,572 dated Jul. 7, 2020.

Office Action for U.S. Appl. No. 16/723,721 dated Jul. 1, 2020.

Extended European Search Report for Application No. EP 18214714.0 dated Jul. 5, 2019, 6 pages.

Final Office Action for U.S. Appl. No. 16/723,662 dated Dec. 18, 2020.

Final Office Action for U.S. Appl. No. 16/723,572 dated Dec. 8, 2020.

Advisory Action for U.S. Appl. No. 16/723,662 dated Mar. 22, 2021.

Non-Final Office Action for U.S. Appl. No. 16/723,572 dated Mar. 22, 2021.

Non-Final Office Action for U.S. Appl. No. 16/723,620 dated Mar. 25, 2021.

Office Action for European Application No. 18214716.5 dated Feb. 5, 2021, 5 pages.

Notice of Allowance for U.S. Appl. No. 16/723,721 dated Nov. 16, 2020.

Notice of Allowance for U.S. Appl. No. 16/723,802 dated Nov. 6, 2020.

Non-Final Office Action for U.S. Appl. No. 16/723,662 dated May 7, 2021.

Office Action for European Application No. 18214718.1 dated Jul. 14, 2021, 9 pages.

Office Action for European Application No. 18214724.9 dated Jun. 30, 2021, 8 pages.

Non-Final Office Action for U.S. Appl. No. 16/723,768 dated Jun. 9, 2021.

Wirola et al., "Bandwidth and Storage Reduction of Radio Maps for Offline WLAN Positioning", 2013 International Conference on Indoor Positioning and Indoor Navigation, (Oct. 28-31, 2013), 9 pages.

Notice of Allowance for U.S. Appl. No. 16/723,572 dated Jul. 13, 2021.

Office Action for European Application No. 18214688.6 dated Aug. 25, 2021, 4 pages.

Office Action for European Application No. 18214694.4 dated Aug. 27, 2021, 4 pages.

Final Office Action for U.S. Appl. No. 16/723,620 dated Sep. 29, 2021.

Final Office Action for U.S. Appl. No. 16/723,662 dated Oct. 15, 2021.

Final Office Action for U.S. Appl. No. 16/723,768 dated Nov. 1, 2021.

Notice of Allowance for U.S. Appl. No. 16/723,768 dated Nov. 22, 2021.

Advisory Action for U.S. Appl. No. 16/723,620 dated Dec. 10, 2021.

Non-Final Office Action for U.S. Appl. No. 16/721,311 dated Feb. 16, 2022.

Notice of Allowance for U.S. Appl. No. 16/723,620 dated Feb. 24, 2022.

Advisory Action for U.S. Appl. No. 16/723,662 dated Jan. 7, 2022.

Office Action for European Application No. 18214721.5 dated May 4, 2022, 6 pages.

Office Action for European Application No. 18214720.7 dated May 4, 2022, 5 pages.

Final Office Action for U.S. Appl. No. 16/721,311 dated Jun. 29, 2022.

Office Action for European Application No. 18214705.8 dated Jun. 30, 2022, 6 pages.

\* cited by examiner

SERVICE FOR REAL-TIME SPOOFING/JAMMING/MEACONING WARNING

CROSS-REFERENCE TO RELATED APPLICATIONS

This application claims priority to European Application No. 18214724.9, filed Dec. 20, 2018, the entire contents of which are incorporated herein by reference.

FIELD

The invention relates to the field of GNSS-based and non-GNSS based radio positioning and more specifically to identifying potentially manipulated radio signals and/or radio signal parameters.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth Low Energy (BLE) based positioning systems, cellular network based positioning systems and wireless local area network (WLAN) based positioning systems.

Such a non-GNSS based radio positioning system (e.g. a self-contained positioning system) may be divided in at least three stages: an installation stage, a training stage and a positioning stage.

In the installation stage, dedicated positioning support radio nodes (e.g. Bluetooth beacons) may be installed in the environment for which a positioning system is to be provided. Alternatively or additionally, a non-GNSS based radio positioning system may make use of existing radio nodes like WLAN access points or cellular network nodes as positioning support radio nodes.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio nodes (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EXEMPLARY EMBODIMENTS

Non GNSS-based radio positioning systems (e.g. Bluetooth, WLAN and cellular based radio positioning systems) as disclosed above may be affected by manipulating radio signals that are used for positioning purposes during the positioning stage.

Manipulation techniques may for example be spoofing or jamming of such radio signals:

Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic signals captured at a different position and/or time. Alternatively, a spoofing malware running on the mobile device may falsify scanning results (e.g. detected radio signal parameters) when the mobile device scans for observable radio signals for estimating its position. Such falsified (i.e. "spoofed") radio signals or scanning results may be used to cause the mobile device to determine its position to be somewhere other than where it actually is.

Jamming of radio signals may be considered to relate a deliberate attempt to disrupt detecting one or more radio signals by a mobile device, for example by transmitting radio signals and/or radio noise interfering the one or more radio signals.

Such manipulation techniques are a threat to business models which rely on trustworthy positioning like car sharing services.

To tackle such threats that are not sustained in nature, in particular for highly sporadic incidents, e.g. keeping a database comprising information of spoofing/jamming/meaconing attempts may not be sufficient enough. When such a threat is sporadic and/or more random in nature, information comprising or representing such threats need to be available at devices performing positioning immediately.

It is, thus, inter alia, an object of the present invention to provide a solution for such sporadic incidents so that such manipulation techniques are preventable in positioning.

According to a first exemplary aspect of the present invention, a method is disclosed, the method comprising:

obtaining one or more pieces of threat information indicative of a data set enabling positioning based on radio signals sent by a respective radio node, and wherein the data set is further indicative of one or more parameters based on which said positioning is performed and/or controlled and which is considered to be at least partially unexpected; and utilizing the one or more pieces of threat information in a positioning, wherein the obtaining of the one or more pieces of threat information is at least one of:

obtaining the one or more pieces of threat information by using an application programming interface; and obtaining the one or more pieces of spoofing information by using a push method.

This method may for instance be performed and/or controlled by an apparatus, for instance a mobile device, e.g. a mobile terminal, a smartphone, a tablet, a wearable, an IoT device. For instance, the method may be performed and/or controlled by using at least one processor of the mobile device. The method may be performed and/or controlled by a module or component executed by such mobile device.

According to a further exemplary aspect of the invention, a computer program is disclosed, the computer program when executed by a processor causing an apparatus, for instance a server or a server cloud, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect (e.g. the first exemplary aspect) of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:

obtaining one or more pieces of data sets, wherein each data set of the one or more pieces of data sets enables positioning based on radio signals sent by a respective radio node, and wherein the data set is further indicative of one or more parameters based on which said positioning is performed and/or controlled and which is considered to be at least partially unexpected;

forming said one or more pieces of data sets into one or more pieces of threat information; and providing the one or more pieces of threat information by using an application programming interface, and/or by using a push method; wherein the provided data sets are utilized in a positioning.

This method may for instance be performed and/or controlled by an apparatus, for instance a server. Alternatively, this method may be performed and/or controlled by more than one apparatus, for instance a server cloud comprising at least two servers. For instance, the method may be performed and/or controlled by using at least one processor of the server or the server cloud. The method may be performed and/or controlled by a module or component executed by such as server or server cloud.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect (e.g. the second exemplary aspect) of the invention may be a module or a component for a device, for example a chip. Alternatively, the disclosed apparatus according to any aspect of the invention may be a device, for instance a mobile device. The disclosed apparatus according to any aspect of the invention may comprise only the disclosed components, for instance means, processor, memory, or may further comprise one or more additional components.

According to a third exemplary aspect of the invention, a system is disclosed, comprising:

a first apparatus according to the first exemplary aspect of the present invention as disclosed above, configured to perform and/or control the method of the first exemplary aspect of the present invention, and a second apparatus according to the second exemplary aspect of the present invention as disclosed above, configured to perform and/or control the method of the second exemplary aspect of the present invention.

The first apparatus and the second apparatus may in particular be configured to perform the respective methods according to the first and the second exemplary aspects of the present invention together.

The method according to the first exemplary aspect of the present invention (performed and/or controlled by the at least one mobile device) and the method according to the second exemplary aspect of the present invention (performed and/or controlled by at least one apparatus, e.g. a server or a server cloud) may for instance be performed and/or controlled together in real-time.

In the following, exemplary features and exemplary embodiments of all aspects of the present invention will be described in further detail.

One or more pieces of threat information indicative of a data set enabling positioning based on radio signals sent by a respective radio node are obtained. The one or more pieces of threat information may for instance be obtained, e.g. by receiving them. The one or more pieces of threat information may for instance be received from at least one apparatus, e.g. a server or a server cloud performing and/or controlling the method according to the second exemplary aspect of the present invention.

The data set is further indicative of one or more parameters based on which said positioning is performed and/or controlled and which positioning is considered to be at least partially unexpected. A radio node based on which signals positioning is performed and/or controlled, wherein said positioning is considered to be at least partially unexpected, may for instance also be referred to as affected radio node.

A respective threat information may thus be indicative of at least one affected radio node that is potentially manipulated. Additionally or alternatively, at least partially based on a respective threat information, such at least one affected radio node may for instance be determined. Additionally or alternatively, a respective obtained threat information may for instance be output, e.g. to one or more further mobile devices, e.g. performing and/or controlling the method according to the first exemplary aspect of the present invention. At least partially based on a respective threat information, the at least one mobile device may for instance be enabled e.g. to increase its sensitivity level of detection of spoofing, jamming, meaconing, or a combination thereof, and/or to take at least one of several actions to avoid a position estimate to be determined which is manipulated, e.g. by blocking the at least one affected radio node from being utilized in such a positioning. A respective threat information may for instance be indicative of one or more satellites (e.g. identified by a corresponding satellite identifier), which may enable positioning, which is considered to be at least partially be unexpected. All of the features described with respect to an affected radio node may for instance equally apply, as far as reasonable, to such satellites being utilized in a positioning.

A respective threat information may for instance be in the form of an alert that may for instance be output (e.g. visually displayed, acoustically output, and/or haptically signaled) to a respective user of the at least one mobile device which has obtained the respective threat information. Additionally or alternatively, the respective threat information may for instance be in another form of an alert that may for instance not be displayed to a respective user of the at least one mobile device which has obtained the respective threat information, but which may for instance at least partially automatically be considered in case e.g. determining of a position at least partially on the respective threat information is performed and/or controlled, e.g. by being utilized in a positioning.

According to an exemplary embodiment of all aspects of the present invention, a respective threat information comprises one or more of the following information i) to iv) associated with at least one affected radio node:

i) an identifier of the at least one affected radio node;
ii) a frequency-band information associated with the at least one affected radio node;
iii) a radio-type information associated with the at least one affected radio node; and
iv) an area in which the at least one affected radio node is located.

According to an exemplary embodiment of the first exemplary aspect of the present invention, the method further comprises:

obtaining a respective threat information output by another mobile device that is different from the at least one mobile device; and
utilizing the obtained threat information in the positioning.

Thus, alternatively to obtaining a respective threat information from a server, as disclosed above, a respective threat information may for instance be obtained, e.g. by receiving the respective threat information from another mobile device, e.g. having locally determined (e.g. generated) a threat information. For instance, such a threat information may for instance be obtained from one or more mobile devices located in the vicinity of the at least one mobile device performing and/or controlling the method according to the first exemplary aspect of the present invention.

The obtained one or more pieces of threat information may for instance be stored e.g. for later use in a/the positioning. For instance, in case the at least one mobile device enters again an area within which one or more affected radio nodes are located, the stored one or more pieces of threat information may for instance be utilized, e.g. to identify such one or more affected radio nodes, and/or further to perform and/or control one or more actions at least partially based on the one or more pieces of threat information.

As disclosed above, the one or more pieces of threat information may for instance be stored in a memory, e.g. comprising a database. Such a memory may for instance be comprised by or be connectable to the at least one mobile device performing and/or controlling the method according to the first exemplary aspect of the present invention. Optionally, such a database may for instance be maintained. The maintaining of such a database may for instance be referred to as keeping the database. The database, or the one or more pieces of threat information stored in the database, may for instance be available upon a certain request so that e.g. independent upon a communication connection information of the database can be retrieved to be further utilized, e.g. for determining a position estimate at least partially based on such one or more pieces of threat information locally by the at least one mobile device. It will be understood that such a retrieving one or more pieces of threat information may for instance be performed and/or controlled by the at least one mobile device performing and/or controlling the method according to the first exemplary aspect, while one or more further steps of the method according to the first exemplary aspect of the present invention are performed and/or controlled.

The one or more pieces of threat information may for instance be obtained by one or more of the following steps (i) or (ii):

(i) obtaining the one or more pieces of threat information by using an application programming interface (API); and (ii) obtaining the one or more pieces of threat information by using a push method.

The respective threat information may for instance be obtained by receiving the threat information, e.g. from a server, or from an entity that is different from the server that relays the threat information to the at least one mobile device. The warning information may for instance be obtained by a push- or a pull method, such as an API (Application Programming Interface). The push-method enables one or more pieces of respective threat information to be pushed onto the at least one mobile device. In particular, the push of a respective threat information may for instance enable that the respective threat information is obtained by the at least one mobile device in real-time, or near real-time. The delay between a knowing of a potential threat and one or more mobile devices (e.g. the at least one mobile device) obtaining a respective threat information indicative of the potential threat is minimized. In contrast, a pull-method enables the at least one mobile device to (e.g. actively) retrieve a respective threat information, e.g. from at least one apparatus (e.g. a server or a server cloud performing and/or controlling the method according to the second exemplary aspect of the present invention), e.g. by sending a request for obtaining one or more pieces of threat information. Then, a respective obtained threat information may for instance be received and utilized (e.g. used) by the at least one mobile device in a/the positioning. Such a pull-method may for instance be subject to more delay between a knowing of a potential threat and one or more respective mobile devices obtaining a corresponding threat information, than a delay by obtaining a corresponding threat information via a push-method.

An API may for instance define an interface, which may for instance be used based on one or more pre-defined commands. This may for instance enable an interaction of the at least one mobile device via the API to obtain the one or more pieces of threat information.

Alternatively or additionally, the one or more pieces of threat information may for instance be obtained by a push method. Such a push method may for instance enable that the one or more pieces of threat information trigger a notification to a respective user of the at least one mobile device.

For instance, the obtaining of the one or more pieces of threat information may for instance be initiated by at least one apparatus, e.g. a server or a server cloud performing and/or controlling the method according to the second exemplary aspect of the present invention. This may also be referred to as server push. Thus, e.g. such a server or server cloud may for instance send a request to transmit the one or more pieces of threat information to the at least one mobile device, to which a user of the at least one mobile device has given his consent prior to receiving such a request. Then, the one or more pieces of threat information may for instance be transmitted from such a server or server cloud to the at least one mobile device.

According to an exemplary embodiment of the first exemplary aspect of the present invention, the one or more pieces of threat information are obtained via at least one of a REST—(Representational State Transfer)-, a MQTT (Message Queuing Telemetry Transport)-, a CoAP (Constrained Application Protocol)-API, or a combination thereof (to name but a few non-limiting examples). All of them enable the at least one mobile device to obtain (e.g. receive) the one or more pieces of threat information in real-time, or near real-time, with a very short delay (e.g. no delay at all in case of real-time), thus, between a knowing of a potential threat and one or more mobile devices (e.g. the at least one mobile device) obtaining a respective threat information indicative of the potential threat.

The mobile device may for instance be portable (e.g. weigh less than 5, 4, 3, 2, or 1 kg). The mobile device may for instance comprise or be connectable to a display for displaying information, e.g. a route that is guided/navigated to a user, to name but one non-limiting example. The mobile device may for instance comprise or be connectable to means for outputting sound, e.g. in the form of spoken commands or information. The mobile device may for instance comprise or be connectable to one or more sensors for determining the devices position, such as for instance a GNSS receiver, in the form of a GPS and/or Galileo receiver. The mobile device may for instance comprise or be connectable to one or more sensors, e.g. in the form of an accelerometer and/or a gyroscope for gathering (e.g. measuring) further information (e.g. radio measurements). The mobile device may for instance comprise or be connectable to a receiver and/or a transmitter (e.g. a transceiver) for receiving and/or sending data and/or information. For instance, the mobile device may comprise one or more radio receivers (e.g. radio transceivers, e.g. cellular radio transceivers), which may for instance enable the method according to the first exemplary aspect of the present invention to be performed and/or controlled. The mobile device may for instance be suitable for outdoor and/or indoor navigation respectively positioning.

For example, the disclosed method(s) according to the first and/or second exemplary aspect of the present invention may be part of a GNNS-based and/or a non-GNSS based radio positioning system, e.g. GNNS-based and/or a non-GNSS based radio positioning system as disclosed above. The at least one mobile device may be enabled for or support such a GNNS-based and/or a non-GNSS based radio positioning system. This may be understood to mean that the at least one mobile device is configured to estimate (e.g. determine) or to cause estimating (e.g. determining) its position at least partially based on a (e.g. gathered) radio measurement comprising or representing radio signal parameters of one or more radio signals (e.g. one or more terrestrial radio signals) obtained at this position (e.g. obtained as a scanning result of scanning for observable radio signals at this position). This may be understood to mean that the at least one mobile device is configured to estimate (e.g. determine) or to cause estimating (e.g. determining) its position at least partially based on a GNSS satellite positioning system, thus, e.g. based on (e.g. gathered) signals of respective satellites comprised by such a GNSS satellite positioning system. Estimating (e.g. determining) of a position of the at least one mobile device at least partially based on (a) radio signal parameter(s) may be understood to mean that the estimating is performed as a function of the radio signal parameter(s). It is however to be understood that the estimating may optionally depend on further information like a radio map. For example, such a radio map may be configured to enable one or more mobile devices (e.g. the at least one mobile device) to estimate their position at least partially based on this radio map when the respective mobile devices are located in the area covered by the radio map. For example, the radio map is represented by radio map information which may be provided (e.g. transmitted) by a positioning server to the respective mobile devices and/or which may be hold available by the respective mobile devices (e.g. stored in memory means of the mobile device(s)). For example, the radio map contains or represents a respective radio model for a plurality of radio nodes transmitting (e.g. broadcasting) radio signals that are observable within an area covered by the radio map. If the radio map covers a venue (e.g. building), the radio map may contain or represent, e.g. for each floor of the venue, a respective radio model for a plurality of radio nodes transmitting (e.g. broadcasting) radio signals that are observable on the respective floor of the venue.

Such a radio node may be a specific WiFi, Bluetooth, cellular, or a combination thereof enabled radio node. For instance, a specific radio node of one or more radio nodes may for instance be identified by its identifier (ID). Thus, the identifier of at least one radio node of the one or more radio nodes may for instance be stored in an accessible database, e.g. as disclosed above, or via the Internet, to identify the respective radio node. Further, based on a respective identifier, for instance, the position of the respective radio node may for instance be determined. To name but one non-limiting example, the respective identifier may be associated with its current position (e.g. in the form of coordinates; x- and y-coordinates or latitude- and longitude-coordinates) so that the position of the respective radio node is at least determinable at least partially based on its identifier.

Such (a) radio node(s) of one or more radio nodes may for instance be used for indoor positioning and/or floor detection, e.g. according to Bluetooth- and/or BLE-specification, or may for instance be a WiFi access point for indoor positioning and/or floor detection, e.g. according to the WLAN-(Wireless Local Area Network) specification).

Such (a) radio node(s) of one or more radio nodes, e.g. of a certain venue or its section, and/or of a certain floor or its section, may for instance comprise or be connectable to a transceiver, e.g. according to the BT-, BLE, and/or WLAN-specification to provide wireless-based communication. Each radio node of the one or more radio nodes may for instance use such a transceiver for transmitting and/or broadcasting one or more radio signals, e.g. comprising or containing one or more information and/or potentially manipulated radio signals and/or radio signal parameters.

A respective radio model for a respective radio node, as disclosed above, may be understood to represent at least the expected radio coverage of the respective radio node (e.g. on a certain floor of a building). For example, the radio model of such a radio node may describe the coverage area (e.g. on a certain floor of a venue) within which radio signals transmitted or triggered to be transmitted by this radio node are expected to be observable. An example for such a radio model is a radio image representing an expected radio signal strength field of the radio signals transmitted or triggered to be transmitted by this radio node. The real radio coverage of such a radio positioning support device may however deviate from the expected radio coverage as described by such a radio model.

Such one or more radio signals may be terrestrial radio signals. Examples of such a terrestrial radio signal are a Bluetooth signal, a BLE signal, a cellular network signal or a WLAN signal. The Bluetooth standards are specified by the Bluetooth Special Interest Group and are presently available under https://www.bluetooth.com/. A cellular network may for example be a mobile phone network like a 2G/3G/4G/5G cellular communication network. The 2G/3G/4G/5G cellular radio communication standards are developed by the 3GPP and presently available under http://www.3gpp.org/. WLAN is for example specified by the standards of the IEEE 802.11 family (http://www.ieee.org/).

A radio signal parameter of a certain radio signal may for example be obtained by the at least one mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, a respective mobile device (e.g. the at least one mobile device) may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information contained in the radio signal and (2) a representation (e.g. an indicator or a value) of a physical quantity (e.g. a received signal strength) of the radio signal. Accordingly, a radio signal parameter may be determined by at least one of (1) extracting information contained in the radio signal and (2) measuring a physical quantity (e.g. a received signal strength) of the radio signal.

In case such (a) radio node(s) transmits potentially manipulated radio signals and/or radio signal parameters, it is referred to such (a) radio node(s) herein as affected radio node(s).

In case (a) potentially affected radio node(s) are identified (e.g. based on its respective identifier, as disclosed above), e.g. an action may be taken when e.g. the at least one mobile device performing and/or controlling the method according to the first exemplary aspect of the present invention is located (or e.g. arriving) again in the affected area within which the affected radio node is located, or when detecting a radio node, which has previously been detected to be spoofed, jammed, and/or meaconed. The action may enable the prevention of a position to be determined (e.g. estimated) which is considered to be at least partially unexpected, in case said positioning is at least partially based on the radio signal(s) or radio signal parameter(s) of the affected radio node.

As disclosed above, potentially manipulated radio signals and/or radio signal parameters may be used for spoofing, jamming, meaconing, or a combination thereof. Thus, once spoofing, jamming, meaconing, or a combination has been detected, providing information indicative of corresponding details in the form of one or more pieces of threat information to one or more mobile devices (e.g. the at least one mobile device performing and/or controlling the method according to the first exemplary aspect of the present invention) in real-time or near real-time can be achieved.

At least one respective threat information of the one or more pieces of threat information may for instance be stored in a memory, e.g. a non-volatile memory. Such a memory may for instance be comprised by or be connectable to the at least one mobile device performing and/or controlling the method according to the first exemplary aspect of the present invention. Further, the at least one respective threat information may for instance be stored in a database comprised by the memory. For instance, such a database may for instance be maintained. The maintaining of such a database may for instance be referred to as keeping the database. For instance, outdated threat information comprised or represented by the database may for instance be removed (e.g. cleaned), and/or one or more new pieces of threat information may for instance be added to the database.

According to an exemplary embodiment of all aspects of the present invention, the one or more parameters of a respective data set of the one or more pieces of threat information comprises or represents one or more of the following parameters i) to v):
  i) radio-type information indicative of at least one radio type that is considered to be potentially manipulated;
  ii) frequency-band information indicative of at least one frequency-band that is considered to be potentially manipulated;
  iii) identifier of at least one radio node enabling positioning that is considered to be potentially manipulated;
  iv) influencing information indicative of a certain type of influence that is considered to be potentially manipulated and/or if certain type of influence is continuous or sporadic or periodic; and
  v) detection information indicative of whether or not detection of manipulation is reliable or uncertain (e.g. indicated by a probability of the detection or by a probability index).

The data set is further indicative of one or more parameters based on which said positioning is performed and/or controlled and which is considered to be at least partially unexpected. For instance, such a respective (affected) radio node comprised or represented by the one or more pieces of threat information may further be associated with (e.g. linked to) a radio-type information. Such a radio-type information may for instance be indicative of that a specific type of radio (e.g. WiFi, Bluetooth, Cellular, or a combination thereof) is under influence. Thus, it could be potentially manipulated.

Further, a respective affected radio node of one or more radio nodes and/or a respective area of one or more areas (and e.g. comprising at least one affected radio node, thus, in which at least one affected radio node is located) as comprised by or represented by the one or more pieces of threat information may further be associated with (e.g. linked to) a radio-type information.

For instance, a respective identifier of a respective radio node (e.g. an affected radio node) may for instance be associated with (e.g. linked to) one or more further pieces of information, e.g. wherein such an information may for instance be a radio-type information.

Further, such a radio-type information associated with a respective radio node and/or associated with at least one area of one or more areas as comprised or represented by the one or more pieces of threat information may be used to filter (e.g. all of) the other radio node(s) and/or area(s) comprised in the one or more pieces of threat information. For instance, in case a certain radio node is affected—thus considered to be potentially manipulated—at least partially based on the associated radio-type information, it may for instance be enabled to identify (e.g. all of) the other radio node(s) using the same radio-type that are comprised or represented by the obtained one or more pieces of threat information, so that e.g. those further identified radio nodes may be e.g. blocked in the positioning to be performed and/or controlled as well.

According to an exemplary embodiment of all aspects of the present invention, the radio-type information is indicative of one or more of the following types i) to iv):
  i) a cellular-based type;
  ii) a WiFi-based type;
  iii) a wireless LPWAN (Low Power Wide Area Network)-based type;
  iv) a Bluetooth-based type; and
  v) a Bluetooth Low Energy-based type.

Thus, at least partially based on the radio-type information, one or more of the following radio signals may for instance be identified to be potentially manipulated:
  a Bluetooth radio signal;
  a Bluetooth Low Energy radio signal;
  a LPWAN radio signal;
  a WLAN radio signal; and
  a cellular radio signal.

Accordingly, one or more respective radio nodes comprised or represented by the one or more pieces of threat information may for instance be one or more of the following types of radio nodes:
  a Bluetooth beacon (e.g. a Bluetooth beacon enabling Bluetooth low energy mode or a Bluetooth low energy beacon);
  a basestation of a wireless LPWAN;
  an access point of a WLAN; and
  a cellular network node.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver of a respective (communication) interface. The Bluetooth and/or BLE radio interface may be configured to transmit Bluetooth and/or BLE radio signals. A Bluetooth beacon that is employed for the invention may be any kind of Bluetooth beacon complying with any present or future standard.

Such Bluetooth beacons may be easily installed as dedicated position support radio nodes at various installation positions and require little to no maintenance. For example, a plurality of Bluetooth beacons may be easily distributed across a certain area and may cover a certain area (e.g. the area of the environment represented by the radio map and/or of the above disclosed system) with Bluetooth radio signals transmitted (e.g. broadcasted) by the Bluetooth beacons. Also, Bluetooth technologies are supported by many mobile devices by default such as most smartphones, most tablet computers, most notebook computers, most smart watches and most smart bands, most IoT device, etc. Using Bluetooth beacons and/or BLE beacons may thus have the effect that many mobile devices may use such non-GNSS based radio positioning system without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of e.g. 2 to 3 meters as well as a high reliability in floor detection may be achieved. The Bluetooth beacons may be stand-alone devices or be integrated into or attached to some other device. Bluetooth beacons, in particular in low energy mode (BLE), require comparably little energy and the use of Bluetooth low energy may enable a positioning with limited energy consumption at all involved devices.

It is to be understood, however, that other types of radio nodes than variations of Bluetooth beacons may be used as well as dedicated position support radio nodes, for instance tags or other devices that are configured to transmit ultra-wideband (UWB) signals or any wireless radio signals that might emerge in the future.

As disclosed above, existing radio nodes like WLAN access points or cellular network nodes may be used as positioning support radio nodes alternatively or additionally.

A WLAN access point may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal.

A base station of a (wireless) LPWAN may for instance enable one or more mobile devices to join (e.g. connect) to the base station. A base station of such a LPWAN may for instance be suitable for outdoor and/or indoor environments. A base station of a LPWAN may for instance enable a wireless communication network according to Sigfox, LoRa (Long Range), and NB-IoT (Narrow Band-Internet of Things) specification, to name but a few non-limiting examples.

Furthermore, such a radio-type information associated with at least one radio node and/or with at least one area may be used to filter (e.g. all of) the other radio node(s) and/or area(s) comprised or represented by the obtained one or more pieces of threat information.

According to an exemplary embodiment of all aspects of the present invention, a respective threat information of the one or more pieces of threat information is indicative of at least one of spoofing, jamming, and meaconing threat to the positioning. Thus, based on a respective threat information the at least one mobile device may for instance be enabled to determine how to avoid that a positioning that is to be performed and/or controlled by the at least one mobile device is manipulated by at least one of spoofing, jamming, and meaconing. In case positioning is performed and/or controlled or triggered to be performed and/or controlled involving at least one affected radio node as is retrievable at least partially based on a respective threat information of the one or more pieces of threat information, which is indicative of at least one of spoofing, jamming, and meaconing threat to the positioning, the at least one mobile device may for instance be enabled to determine the at least one affected radio node and/or an area in which the at least one affected radio node is located.

The positioning may for instance be intended to be performed and/or controlled by the at least one mobile device performing and/or controlling the method according to the first exemplary aspect of the present invention.

According to an exemplary embodiment of the first exemplary aspect of the present invention, the method further comprises:
  determining at least one affected radio node based on the one or more pieces of threat information; and
  blocking the at least one affected radio node from being utilized in the positioning.

The at least one affected radio node may for instance be determined e.g. by extracting information identifying the at least one affected radio node out of the obtained (e.g. received) one or more pieces of threat information. The at least one affected radio node may for instance be identified based on an identifier that may for instance be comprised or represented by the one or more pieces of threat information.

For instance, a specific radio node of one or more radio nodes may for instance be identified by its identifier (ID). Thus, the identifier of at least one radio node may for instance be stored in a database to identify the respective radio node, which may for instance be accessible by the at least one mobile device. Further, based on a respective identifier, for instance, the position of the respective radio node may for instance be determined. To name but one non-limiting example, the respective identifier may be associated with its current position (e.g. in the form of coordinates; x- and y-coordinates or latitude- and longitude-coordinates) so that the position of the respective radio node is at least determinable at least partially based on its identifier. For instance, the position of a respective radio node may for instance be stored in such a database as well. Such a database may for instance be comprised by or connectable to a server or server cloud, so that the database may for instance be accessible via a communication network (e.g. the Internet).

Then, the determined at least one affected radio node may for instance be blocked from being utilized in the positioning. For instance, this may enable to avoid that the at least one affected radio node respectively one or more radio signals sent by the at least one affected radio node are considered in the positioning.

According to an exemplary embodiment of the first exemplary aspect of the present invention, the method further comprises:
  checking a timestamp information associated with a respective threat information of the one or more pieces of threat information to determine whether or not the one or more pieces of threat information are real-time information (e.g. or they are outdated), wherein the respective pieces of the one or more pieces of threat information that are real-time information are utilized (e.g. stored locally and then used) in the positioning.

It is mentioned that in some case one or more mobile device(s) (e.g. the at least one mobile device performing and/or controlling the method according to the first exemplary aspect of the present invention) might also have stored a local database, e.g. in a memory comprised by or connectable (to the at least one mobile device). Such a local database may for instance store the one or more pieces of threat information, and/or the at least one affected radio node, which may for instance be determinable, to name but a few non-limiting examples.

Further, the mobile device(s) (e.g. the at least one mobile device performing and/or controlling the method according to the first exemplary aspect of the present invention) may for example selectively replace records, e.g. in the local database, by comparing timestamp information, e.g. newer information respective data replaces old(er) information respective data, to the ones stored in the database. In this way, it is enabled to keep information derived at least partially based on the one or more pieces of threat information up-to-date, and/or to enable the usage of the one or more pieces of threat information in real-time.

According to an exemplary embodiment of the first exemplary aspect of the present invention, the checking further comprises:

checking a position of the at least one mobile device with a location associated with a respective parameter of the one or more parameters of a respective threat information of the one or more pieces of threat information, wherein the respective pieces of the one or more pieces of threat information that are associated with the position of the at least one mobile device (e.g. near or within a certain distance from the position of the at least one mobile device) are utilized (e.g. stored locally and then used) in the positioning; and/or checking a capability information indicative of at least one capability utilized in a positioning, and that is associated with a respective threat information of the one or more pieces of threat information with certain capabilities of the at least one mobile device, wherein the respective piece of threat information of the one or more pieces of threat information that are relevant considering the certain capabilities of the at least one mobile device, are utilized (e.g. stored locally and then used) in the positioning.

Moreover, such one or more pieces of threat information, may for instance comprise or represent information indicative of a position and/or an area in which one or more threats (e.g. manipulation such as spoofing, jamming, and/or meaconing) could occur. Further, in such one or more pieces of threat information, there may for instance be comprised or represented information indicative of one or more capabilities (such as radio-type and/or frequency-band, to name but a few non-limiting examples) which could be subject to one or more threats (e.g. manipulation such as spoofing, jamming, and/or meaconing).

After obtaining the one or more pieces of threat information, the at least one mobile device may for instance check whether or it is located within the vicinity of the one or more threats, and/or whether or not one or more capabilities of the at least one mobile device match to one or more capabilities which could potentially be subject to one or more threats. For instance, in case the result of such a checking is that e.g. the at least one mobile device is not located within the vicinity of one or more potential threats, and/or the at least one mobile device does not comprise or have one or more capabilities that are subject to one or more potential threats, e.g. the at least one mobile device may for instance ignore the one or more pieces of threat information.

However, in example embodiments, the at least one apparatus performing and/or controlling the method according to the second exemplary aspect of the present invention may only provide (e.g. output and/or send) one or more pieces of threat information (that are obtained by the at least one mobile device performing and/or controlling the method according to the first exemplary aspect of the present invention) which may for instance be filtered prior to the providing. In this way, the at least one mobile device may for instance only obtained one or more pieces of threat information which are subject e.g. to a position and/or one or more capabilities of the at least one mobile device. Then, the respective checking of a position of the at least one mobile and/or the respective checking of a capability information may for instance enable to verify that the at least one mobile device could be subject to the one or more threats, as comprised or represented by the one or more pieces of threat information. Alternatively, such checking may for instance be not be performed and/or controlled.

The at least one mobile device may for instance also state information comprising or representing one or more radio capabilities and/or one or more e.g. relatively up-to-date position estimate(s) of its own position (e.g. not older than 10, 20, 30 minutes, or 1 hour, to name but a few non-limiting examples) of the at least one mobile device to the at least one apparatus performing and/or controlling the method according to the second exemplary aspect of the present invention, e.g. prior to obtaining the one or more pieces of threat information. Such information comprising or representing one or more radio capabilities of the at least one mobile device may for instance be stored by the at least one apparatus performing and/or controlling the method according to the second exemplary aspect of the present invention, so that e.g. one or more pieces of threat information may for instance be filtered according to the stated information enabling that the at least one mobile device may for instance only obtain one or more pieces of threat information which are subject e.g. to a position and/or one or more capabilities of the at least one mobile device.

According to an exemplary embodiment of all aspects of the present invention, the one or more certain capabilities of the at least one mobile device are indicative of one or more capabilities i) to ii):

i) radio-type of the at least one mobile device; and
ii) frequency-band of the at least one mobile device.

In this way, e.g. based on a certain radio-type of the at least one mobile device and/or based on a certain frequency-band of the at least one mobile device performing and/or controlling the method according to the first exemplary aspect of the present invention, for instance, only respective threat information which are considered to be relevant to the respective mobile device and matching a respective radio-type and/or frequency-band which can be utilized by the at least one mobile device may for instance be obtained by the respective device. Alternatively, the at least one mobile device may for instance check whether or not a respective obtained (e.g. received) threat information is related to a respective radio-type and/or frequency-band which can be utilized by the at least one mobile device, e.g. by comparing a corresponding information comprised by or represented by the respective threat information with the actual radio-type and/or frequency-band of the at least one mobile device. For instance, a capability information comprising or represent the actual radio-type and/or frequency-band of the at least one mobile device may for instance be stored locally, e.g. in a memory comprised by or connectable to the at least one mobile device.

According to an exemplary embodiment of all aspects of the present invention, the positioning is a GNSS- and/or a non-GNSS positioning, wherein the non-GNSS positioning is at least one of:

a radio-network based positioning; and
a sensor-based positioning.

In particular, the radio-network based positioning may for instance be one of:
- a cellular-based positioning, in particular, a cellular-phone-system-based positioning;
- a LPWAN-based positioning;
- a WiFi-based positioning; and
- a Bluetooth-based positioning, in particular a Bluetooth Low Energy radio positioning.

In particular, the sensor-based positioning may for instance be one of:
- a magnetic field based positioning, e.g. enabled by a respective magnetic field sensor(s).
- inertial sensor based positioning, e.g. enabled by at least one accelerometer and/or one or more gyroscope sensors, to name but a few non-limiting examples.

According to an exemplary embodiment of all aspects of the present invention, the data set further comprises a position information indicative of a position of the at least one radio node enabling positioning that is considered to be potentially unexpected, or wherein the position information is determined based on the identification information of at least one radio node enabling positioning that is considered to be potentially manipulated.

As disclosed above, a radio map may be determined by a positioning server (e.g. the at least one apparatus performing and/or controlling the method according to the second exemplary aspect of the present invention) during the training stage of a non-GNSS based radio positioning system. Causing of determining (e.g. estimating) of a position of a mobile device (e.g. the at least one mobile device) at least partially based on the radio signal parameter(s) may be understood to mean that the radio signal parameter(s) are provided (e.g. transmitted) by a respective mobile device to a server (e.g. a positioning server performing and/or controlling the method according to the first exemplary aspect of the present invention) to cause the server to determine a position of the mobile device at least partially based e.g. on the radio signal parameter(s).

The determining of one or more affected radio nodes, and/or of one or more areas within which e.g. one or more affected radio nodes (e.g. the at least one radio node) are located, or alternatively, within which none affected radio node is located, and/or of a respective position estimate may for instance be determined by a processor of the at least one mobile device performing and/or controlling the method according to the first exemplary aspect of the present invention. For instance, such a radio map may be utilized to determine a position of the at least one affected radio, as disclosed above.

Then, e.g. the apparatus performing and/or controlling performing and/or controlling the method according to the second exemplary aspect of the present invention may for instance determine a position estimate indicative of the position at which a radio measurement (e.g. measured radio signal parameter(s)) was gathered by the at least one mobile device. Then, at least one affected radio node and/or an area may for instance be determined in which the at least one mobile device is located, to provide one or more pieces of threat information which are relevant to the position of the at least one mobile device.

According to an exemplary embodiment of the first exemplary aspect of the present invention, the method further comprises:
- gathering a second data set based on radio signals of one or more radio nodes enabling positioning; and
- outputting the second data set together with a timestamp information indicative of a time and/or date at which the second data set was gathered.

The second data set may for instance be gathered, e.g. by measuring the second data set by the at least one mobile device. At least partially based on this second data set, a server or a server cloud (e.g. the at least one apparatus performing and/or controlling the method according to the second exemplary aspect of the present invention) may for instance form a geospatial index and provide it to other mobile devices that can then consider the information when performing and/or controlling positioning, e.g. the other mobile devices may for instance obtain such information as one or more pieces of threat information. This may for instance be performed and/or controlled in case a database (e.g. a database that should comprise one or more pieces of threat information formed out of the respective data set(s)) does not preexist. Further, at least partially based on this second data set, a server or a server cloud (e.g. the at least one apparatus performing and/or controlling the method according to the second exemplary aspect of the present invention) may for instance update such a database so that such a database may for instance be up-to-date with the latest information (e.g. the gathered second data set).

The second data set may for instance comprise or have the same features as described with respect to the data set of the one or more pieces of threat information as used by a method according to the first exemplary aspect of the present invention.

The one or more pieces of data sets may for instance be obtained, by the at least one apparatus performing and/or controlling the method according to the second exemplary aspect of the present invention, e.g. by receiving the one or more pieces of data sets from one or more mobile devices. For instance, the one or more mobile devices may for instance be configured to perform and/or control the method according to the first exemplary aspect of the present invention. A respective data set of the one or more pieces of data sets may for instance be gathered by a respective mobile device of the one or more mobile devices, as a second data set, as disclosed above. Then, the gathered second data set may for instance be output (e.g. send) by a respective mobile device to the at least one apparatus, which may for instance obtained this data set as a respective data set of the obtained one or more pieces of data sets.

Thus, a respective data set of the one or more pieces of data sets may for instance be the a respective second data set gathered based on radio signals of one or more radio nodes enabling positioning gathered by at least one mobile device (e.g. the at least one mobile device performing and/or controlling the method according to the first exemplary aspect of the present invention), and which second data set is output (e.g. send) by the at least one mobile device so that it can be obtained as a respective data set by the at least one apparatus performing and/or controlling the method according to the second exemplary aspect of the present invention.

Such one or more pieces of data sets may for instance be stored in a database. Further, such a respective data set of the database comprises or associated with a certain mobile device, e.g. an identifier of a respective mobile device. Further, a respective data set of the database may for instance comprise or be associated with one or more capabilities of a respective mobile device, e.g. one or more capabilities as disclosed above.

Then, e.g. a respective data set may for instance be formed into a respective threat information, e.g. dependent upon an identifier of a respective mobile device, and/or dependent upon one or more capabilities. In this way, a respective threat information may for instance be provided e.g. to a certain mobile device at least partially based on a respective identifier of the mobile device. Additionally or alternatively, a respective threat information may for instance be provided to a respective mobile device, or to a plurality (e.g. at least two) of respective mobile devices at least partially based on one or more capabilities. For instance, only a respective mobile device of the plurality of mobile device may for instance be provided with a respective threat information, wherein the respective threat information is not relevant to this plurality of mobile device. For instance, in case a respective threat information is indicative of a threat for a certain radio-type, and/or a certain frequency-band, only (s) respective mobile device(s) which have at least one of the one or more capabilities may for instance be provided with the respective threat information. In this way, e.g. the amount of information respectively data to be transmitted between the at least one apparatus performing and/or controlling the method according to the second exemplary aspect of the present invention and at least one mobile device performing and/or controlling the method according to the first exemplary aspect of the present invention may for instance be kept low. Of course, a respective threat information may for instance be provided (e.g. transferred) to one or more location-based services so that such (a) location-based service(s) may for instance utilize one or more pieces of threat information. For instance, such (a) location-based service may for instance themselves provide a respective threat information to one or more respective device(s).

Forming the obtained one or more pieces of data sets into one or more pieces of threat information may for instance comprise one or more rawer data sets (e.g. comprising raw measurement data of the respective mobile device which has gathered the data set). Furthermore, forming the obtained one or more pieces of data sets into one or more pieces of threat information may for instance comprise aggregating information respectively data from multiple sources into one or more pieces of threat information. The information respectively data from multiple sources may for instance be other apparatuses which may perform and/or control another method according to the second exemplary aspect of the present invention. In this way, it is enabled to keep and provide one or more pieces of threat information e.g. indicative of spoofing, jamming, and/or meaconing threats up-to-date (e.g. fresh). Further, it is enabled to provide (e.g. distribute) the one or more pieces of threat information back to one or more mobile device, e.g. configured as clients, and/or e.g. to one or more components responsible for cloud-based positioning in a location-based service, to name but a few non-limiting examples. The one or more pieces of threat information may for instance be provided, e.g. by outputting (e.g. sending) at least a part of the one or more pieces of threat information to the one or more mobile devices, and/or to the one or more components responsible for cloud-based positioning in a location-based service, e.g. via a communication interface of the at least one apparatus. Such a communication interface may for instance comprise one or more radio transceivers (e.g. transmitter and receiver), e.g. according to WLAN-, BT-, BLE-, cellular-communication standard, or a combination thereof, to name but a few non-limiting examples.

The forming of one or more pieces of threat information may for instance comprise arranging them to a geospatial index. For instance, arranging one or more pieces of threat information, and/or other information and/or data of multiple (e.g. external) sources into the one or more pieces of threat information may for instance be performed and/or controlled straightforward, e.g. directly as the respective information and/or data (e.g. the one or more pieces of data sets) comes in. The information respectively data contents, in particular comprised by or represented by the one or more pieces of data sets, may be one or more of the following:

one or more radio types (e.g. WiFi, Bluetooth, Cellular, etc.) under influence;
one or more radio bands (e.g. 2.4 GHz WiFi, 5 GHz WiFi, etc.) under influence;
one or more types of influence (e.g. spoofing/jamming/meaconing);
one or more identities of one or more radio nodes under influence;
whether a determined influence detection is considered to be reliable/uncertain; and
if a determined influence is considered to be continuous/sporadic/periodic.

At least a part of the one or more pieces of formed threat information (e.g. a subset) may for instance be provided by outputting the part of the one or more pieces of formed threat information, e.g. to another entity that is different from a respective mobile device of the mobile devices, and/or which is different from the one or more components responsible for a cloud-based positioning in a location-based service, and which transmits (e.g. relays) the output part of the of the one or more pieces of formed threat information to the respective mobile device and/or respective component.

Further, in case at least the part one or more pieces of formed threat information may for instance be provided to be utilized in offline positioning, at least a part one or more pieces of formed threat information is output (e.g. send, in particular via a push method and/or output via an API) to one or more mobile devices that perform and/or control positioning at least partially based on the output part one or more pieces of formed threat information, or a part of it.

Further, a position of one or more mobile devices (e.g. the at least one mobile device performing and/or controlling the method according to the first exemplary aspect of the present invention) may for instance be determined, e.g. in order to determine to which respective mobile device one or more pieces of threat information may for instance be provided. For instance, a positioning request may for instance be sent to a positioning server by the at least one apparatus. Such a positioning request may for instance comprise or represent an identifier of the respective mobile device whose position is requested to be determined. Thus, the request may for instance not be output by the mobile device performing and/or controlling the method according to the first exemplary aspect of the present invention, but by the at least one apparatus, and/or even by a third party. In response to the positioning request, a position estimate indicative of an estimated position of the respective mobile device may for instance be received. Such a position estimate may for instance be in the form of coordinates, e.g. x-, y-coordinates, and/or latitude-, longitude-coordinates. Optionally, such a position estimate may for instance comprise or represent a three-dimensional position, e.g. in the form of three-dimensional coordinates (e.g. x-, y-, z-coordinates, and/or latitude-, longitude-, altitude-coordinates). In order to determine a position estimate, such a positioning server may for instance utilize a radio map, as disclosed above.

According to an exemplary embodiment of the second exemplary aspect of the present invention, only a part (e.g. of a full (e.g. global) database comprising one or more pieces of threat information) of the one or more pieces of threat information is provided dependent upon a position, and/or upon one or more capabilities of a respective mobile device to which the part of the one or more pieces of threat information is provided.

A respective mobile device (e.g. performing and/or controlling the method according to the first exemplary aspect of the present invention) may for instance not require a full (e.g. global) database, respectively all of the available pieces of threat information. Thus, when a respective mobile device may for instance retrieve (e.g. request) the respective pieces of threat information, e.g. via an API, where the respective pieces of threat information may for instance be requested e.g. from the server or a server cloud performing and/or controlling the method according to the second exemplary aspect of the present invention, the respective mobile device may for instance provide e.g. an indication of its position (e.g. a position estimate) prior to the requesting or together with the request. In this way, e.g. the server or server cloud performing and/or controlling the method according to the second exemplary aspect of the present invention may for instance return relevant pieces of threat information for the surroundings of the respective mobile device (e.g. an area—e.g. a subset of the database—in which the respective mobile device is located, only). Further, this enables to keep the size of the data to be transferred to the respective mobile device, e.g. from the server or the server cloud low. Moreover, in such a request the respective mobile device(s) may for instance also state information comprising or representing one or more capabilities (e.g. radio-band or frequency-band) of the respective mobile device, so that e.g. subsets of the pieces of threat information may for instance only be provided to the respective mobile device(s) for the relevant radios and/or frequency-bands.

According to an exemplary embodiment of the second exemplary aspect of the present invention, a respective data set of the one or more pieces of data sets is associated with a timestamp information indicative of a time and/or date at which the respective data set was gathered prior to the obtaining of said respective data set (by the at least one apparatus performing and/or controlling the method according to the second exemplary aspect of the present invention).

The timestamp information may for instance be indicative of a current time and/or date when it is associated with a respective data set. The timestamp information may for instance be used to reject out-dated information (e.g. obtained one or more pieces of data sets, to name but one non-limiting example). The timestamp information may for instance be used to determine whether or not e.g. one or more pieces of threat information (e.g. formed out of the obtained one or more pieces of data sets, thus, they may for instance comprise or be associated with the timestamp information) are considered to be unreliable. For instance, the older e.g. a respective threat information is, the more unreliable its represented information can be considered to be.

In this way, a recipient, e.g. at least one mobile device performing and/or controlling the method according to the first exemplary aspect of the present invention may for instance be enabled to obtain (e.g. receive) only (a) respective threat information formed at least partially based on the respective data set(s) which may for instance be relevant for the respective at least one mobile device. Additionally or alternatively, such a timestamp information may for instance be used as a "filter" criterion, and then, considering one or more capabilities of the respective at least one mobile device, e.g. one or more capabilities as disclosed above with respect to the method according to the first exemplary aspect of the present invention, may for instance be further used to filter which may for instance be relevant for the respective at least one mobile device.

According to an exemplary embodiment of all aspects of the present invention, the method (according to the first exemplary aspect of the present invention) and/or the method (according to the second exemplary aspect of the present invention) is performed and/or controlled in real-time.

The term real-time, as used herein, is considered to comprise that the steps of the gathering, outputting and obtaining are performed and/or controlled so that the processing to have one or more result(s) available is finished within a specified period of time. Further, the term near real-time, as used herein, refers to a specified period of time that is in particular longer than the specified period of time defined by the term real-time. Further, the term near real-time, as used herein, may additionally refer to that the processing to have one or more result(s) available of the steps of the gathering, outputting and obtaining are dependent to be finished upon pre-determined time intervals, at which the results may be available, e.g. every 10, 20, 30, or more seconds, to name but a few non-limiting examples.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 3b-c are flowcharts illustrating exemplary embodiments of a method according to the first exemplary aspect of the present invention, which may for instance be performed and/or controlled in addition to the flowchart of FIG. 3a;

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
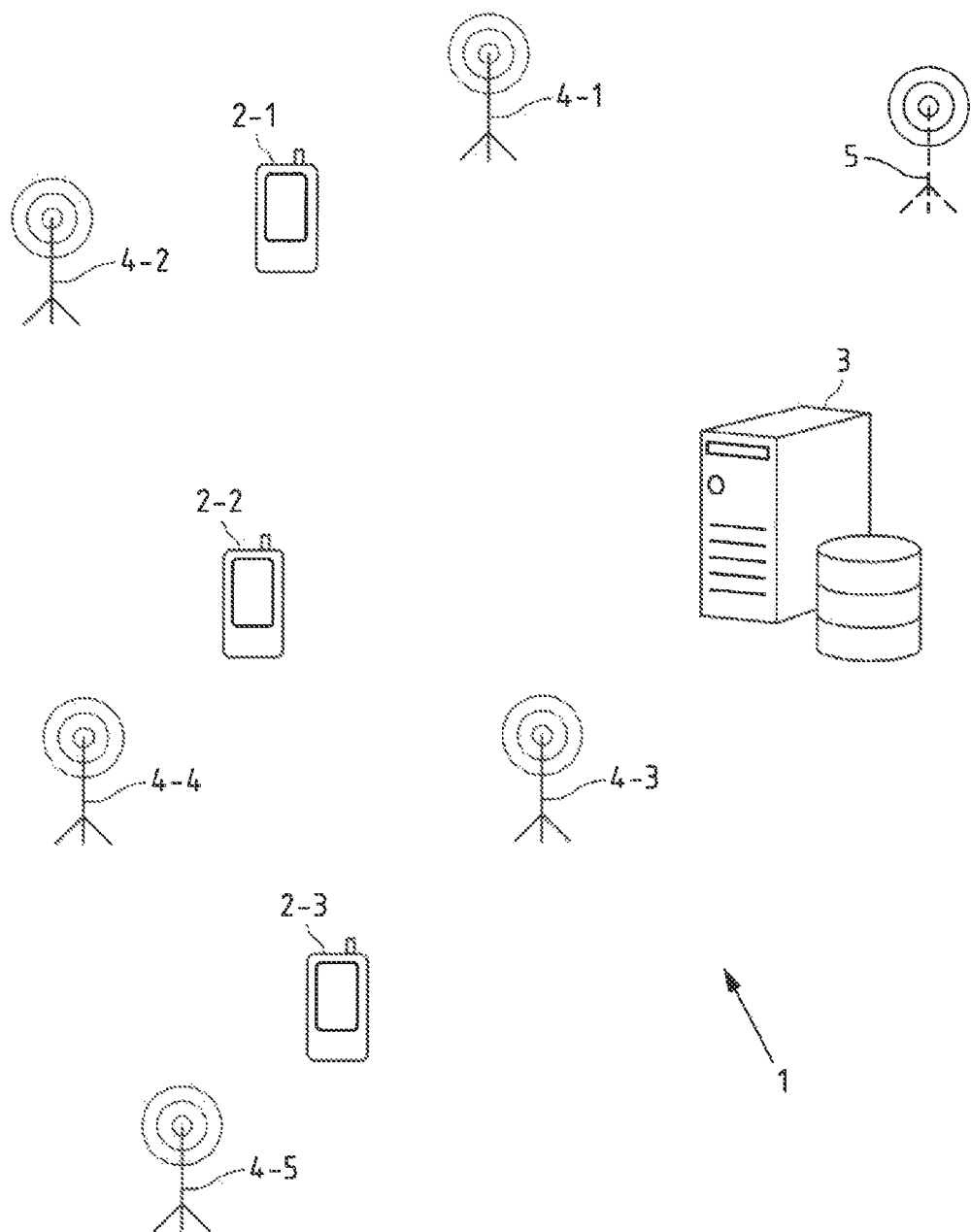
FIG. 1 is a block diagram of an exemplary embodiment of a system according to the third exemplary aspect of the present invention.

FIG. 1 is a schematic high-level block diagram of a system 1 according to an exemplary aspect of the present invention. In the following, it is assumed that system 1 is a non-GNSS based radio positioning system for a predetermined environment like a venue (e.g. building or a complex of buildings, such as a shopping center, a parking garage, an airport, a company site, etc.).

For example, each of mobile devices 2-1 to 2-3 may be one of a smartphone, a tablet computer, a notebook computer, a smart watch, a smart band, and an IoT device. Mobile devices 2-1 to 2-3 may be enabled for or support non-GNSS based radio positioning system 1.

System 1 comprises an affected (e.g. spoofed) radio node 5, which may for instance be installed by a fraudulent third party in the venue. Thus, this radio node 5 may for instance employ a manipulation technique like spoofing, jamming and/or meaconing in the venue so that position estimates determined in the venue under consideration of radio signals and/or radio signal parameters of this radio node 5 comprise or represent a false position.

System 1 comprises a positioning server 3 and a plurality of optional radio nodes 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio nodes 4-1 to 4-5 are dedicated position support radio nodes in the form of BLE beacons 4-1 to 4-5 fixedly installed in the predetermined environment of system 1. However, system 1 may comprise further radio nodes or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio nodes 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio nodes 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 3 for determining a radio map.

For example, the radio map may be configured to enable mobile devices 2-1 to 2-3 to determine (e.g. estimate) their position at least partially based on this radio map when the mobile devices are located within the predetermined environment of system 1 (i.e. the area covered by the radio map). For example, the radio map is represented by radio map information which may be provided (e.g. transmitted) by a positioning server 3 to mobile devices 2-1 to 2-3 and/or which may be hold available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio node. For example, the radio model of such a BLE beacon may at least describe the coverage area within which radio signals transmitted by this radio node are expected to be observable.

In the positioning stage, mobile devices 2-1 to 2-3 may use the radio map to determine (e.g. estimate) their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 an 4-3.

As discussed above, non GNSS-based radio positioning systems like system 1 and/or a GNSS-based positioning system, may be affected by manipulating radio signals that are used for positioning purposes during the positioning stage. Manipulation techniques may for example be spoofing or jamming of such radio signals as described above in more detail. For example, an attacker may install the affected (e.g. spoofed) radio node 5 in a certain area to deceive mobile devices 2-1 to 2-3 to cause them to determine to be located within the overlapping region of the coverage areas described by the radio models of BLE beacons 4-1, 4-2 an 4-3. The spoofing radio node 5 may be configured to (e.g. automatically and/or repeatedly) transmit spoofed BLE radio signals containing or representing the UUIDs of BLE beacons 4-1, 4-2 and 4-3. If mobile devices 2-1 to 2-3 determine (e.g. estimate) their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area.

Example embodiments according to all aspects of the present invention enable e.g. a real-time spoofing, jamming, and/or meaconing warning service for network and/or GNSS-based positioning, wherein a real-time data on spoofing, jamming, and/or meaconing attempts respectively threats are collected e.g. via respective mechanisms (e.g. by server 3) e.g. to determine identifying information of one or more radio nodes (e.g. radio node 5), which enable positioning that is considered to be at least partially unexpected, and/or additional sources which may for instance include e.g. governmental information, or the like, to name but a few non-limiting examples;

spoofing, jamming, meaconing information representing one or more threats (e.g. comprised or represented by one or more pieces of threat information) is published (e.g. provided) in real-time to one or more mobile devices (e.g. mobile devices 2-1 to 2-3), and/or to be retrievable by the service users, e.g. via an API (e.g. a REST API). Additionally or alternatively, the one or more threats (e.g. comprised or represented by one or more pieces of threat information) is published (e.g. provided) in real-time to one or more mobile devices (e.g. mobile devices 2-1 to 2-3), e.g. by pushing one or more pieces of threat information to the mobile devices via a push message service.

Figure 2:
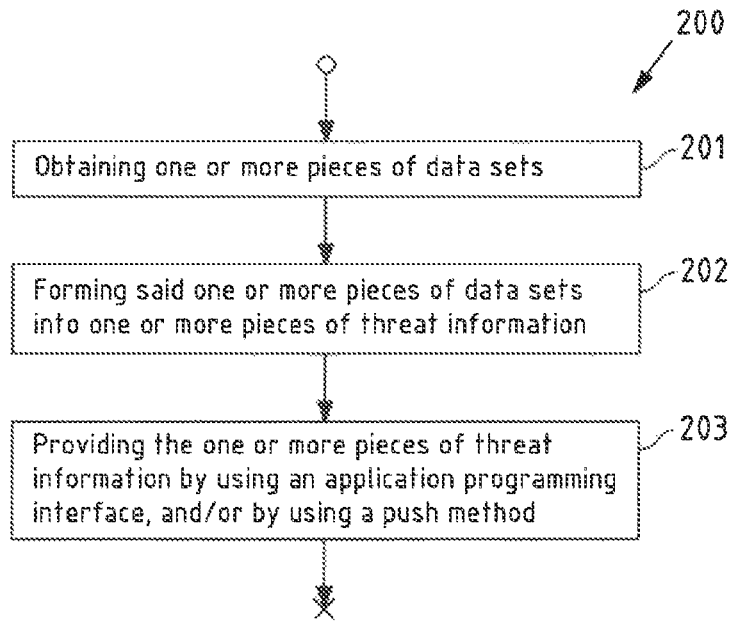
FIG. 2 is a flowchart illustrating an exemplary embodiment of a method according to the second exemplary aspect of the present invention.

FIG. 2 is a flowchart 200 showing an example embodiment of a method according to the second exemplary aspect of the present invention. This flowchart 200 may for instance be performed by a server or a server cloud, e.g. server 3 of FIG. 1.

In a first step 201, one or more pieces of data sets are obtained. The one or more pieces of data sets may for instance be obtained by receiving the one or more pieces of data sets, e.g. from one or more mobile devices (e.g. mobile device 2-1 to 2-3 of FIG. 1). Also, one or more pieces of data sets may for instance be obtained from other sources, e.g. other positioning servers (not shown in FIG. 1), or other electronic devices, such as IoT-devices, portable navigation devices, smartwatches, to name but a few non-limiting examples. The one or more pieces of data sets may for instance be received directly e.g. from the mobile devices, or alternatively, from entities that are different e.g. from the mobile devices, and which relay the one or more pieces of data sets to the server.

In a second step 202, said one or more pieces of data sets are formed into one or more pieces of threat information. The forming of the one or more pieces of threat information may for instance be performed by at least one processor (e.g. processor 410 of apparatus 400 of FIG. 4).

In a third step 203, the one or more pieces of threat information are provided, e.g. to one or more mobile devices (e.g. mobile devices 2-1 to 2-3 of FIG. 1) by using an application programming interface, and/or by using a push method. The one or more pieces of threat information, or a part of it (e.g. a subset of the one or more pieces of threat information) may for instance be provided to at least one of a plurality of mobile devices (e.g. at least one of the mobile device 2-1 to 2-3 of FIG. 1), and/or to a location-based service. The one or more pieces of threat information may for instance be provided, e.g. by sending the one or more pieces of threat information, e.g. via communication interface (e.g. communication interface(s) 450 of apparatus 400 of FIG. 4).

Figure 3A:
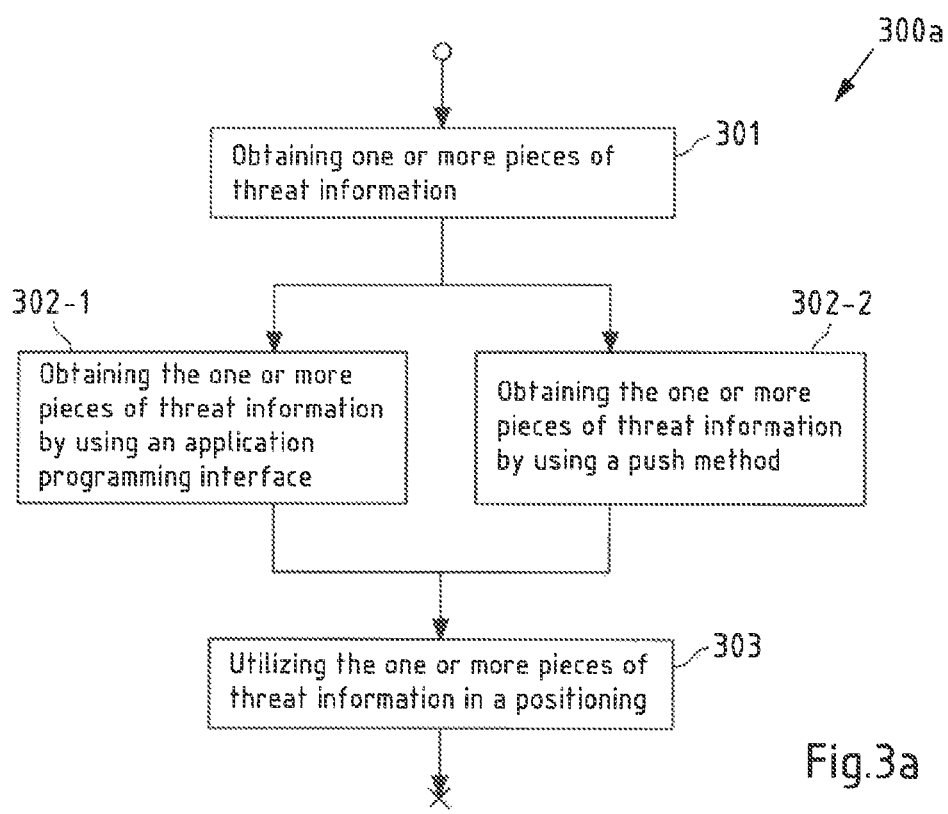
FIG. 3a is a flowchart illustrating an exemplary embodiment of a method according to the first exemplary aspect of the present invention.

FIG. 3a is a flowchart 300a showing an example embodiment of a method according to the first exemplary aspect of the present invention. This flowchart 300a may for instance be performed by a mobile device, e.g. a mobile terminal. This flowchart 300a may for instance be performed by at least one of the mobile devices 2-1 to 2-3 of FIG. 1.

In a first step 301, one or more pieces of threat information are obtained. The one or more pieces of threat information may for instance be obtained by receiving the one or more pieces of threat information, e.g. from a server or a server cloud (e.g. server 3 of FIG. 1) performing flowchart 200 of FIG. 2. The one or more pieces of threat information may for instance be received directly e.g. from the server or server cloud, or alternatively, from an entity that is different e.g. from the server or server cloud, and which relays the one or more pieces of threat information to the mobile device.

In a second step 302-1, alternative 1, the one or more pieces of threat information are obtained by using an application programming interface. For instance, the mobile device may for instance (e.g. actively) request the one or more pieces of threat information via such an API.

In a second step 302-2, alternative 2, the one or more pieces of threat information are obtained by using a push method. For instance, the mobile device may for instance (e.g. directly) be requested to accept that the one or more pieces of threat information are pushed to the mobile device.

In a third step 303, the one or more pieces of threat information are utilized in a positioning. For instance, a position estimate is determined at least partially based on the one or more pieces of threat information.

Figure 3B:
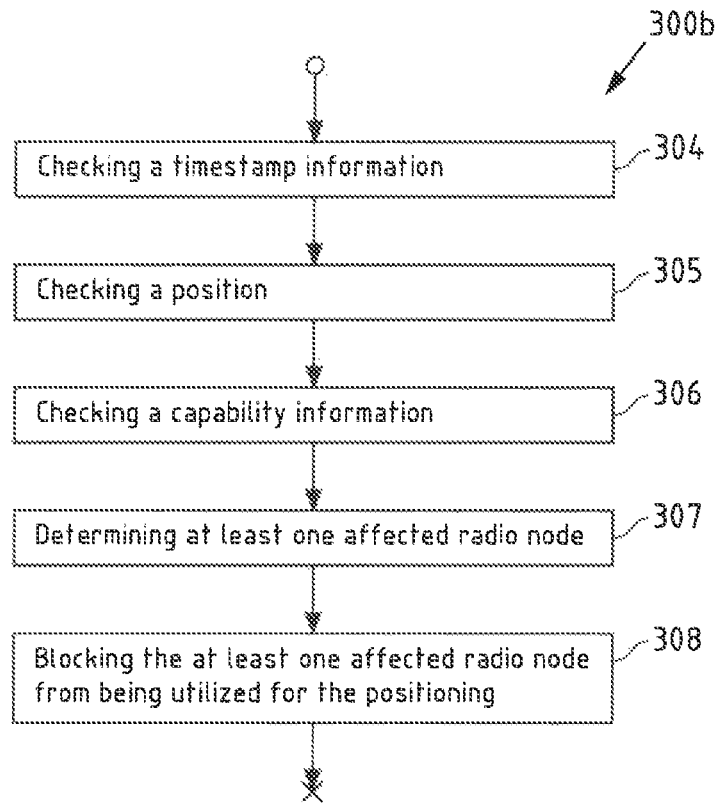

FIG. 3b is a flowchart 300b showing an example embodiment of a method according to the first exemplary aspect of the present invention. This flowchart 300b may for instance be performed by a mobile device, e.g. a mobile terminal. This flowchart 300b may for instance be performed by at least one of the mobile devices 2-1 to 2-3 of FIG. 1. The flowchart 300b may for instance be performed in addition to the flowchart 300a of FIG. 3a. Any of the further steps 304 to 308 may for instance be performed in parallel or after any of the steps 301 to 303 of flowchart 300a of FIG. 3a.

In a step 304, a timestamp information is checked. In such a case, the mobile device may for example selectively replace records in a locally stored database (e.g. data memory 540 of apparatus 500 of FIG. 5) and/or determine whether or not obtained one or more pieces of threat information (see step 301 of FIG. 3a) are outdated, e.g. by comparing timestamps—newer data replaces old data.

In a step 305, a position is checked. In such a case, the mobile device may for instance determine whether or not obtained one or more pieces of threat information (see step 301 of FIG. 3a) are related to a position at which the mobile device is located. The position may for instance be checked via a GNSS-based positioning and/or via a non-GNSS-based positioning. In particular, in case the obtained one or more pieces of threat information are indicative of one or more potential threats of at least one affected radio being a part of a non-GNSS-based positioning system, the position may for instance be checked based on a GNSS-based positioning.

In a step 306, a capability information is checked. In such a case, the mobile device may for instance determine whether or not obtained one or more pieces of threat information (see step 301 of FIG. 3a) are related to one or more capabilities of the mobile device.

In a step 307, at least one affected radio node is determined. The at least one affected radio node may for instance be determined at least partially based on the one or more pieces of threat information obtained (see step 301 of FIG. 3a). The at least one affected radio node may for instance be determined by a processor (e.g. processor 510 in case flowchart 300b is performed and/or controlled by apparatus 500 of FIG. 5).

In a step 308, the at least one affected radio node is blocked from being utilized for the positioning. Further, for instance, a frequency-band associated with the at least one affected radio node may for instance be blocked from being utilized in a positioning. Further, e.g. a radio type associated with the at least one affected radio node is blocked from being utilized in a positioning.

Figure 3C:
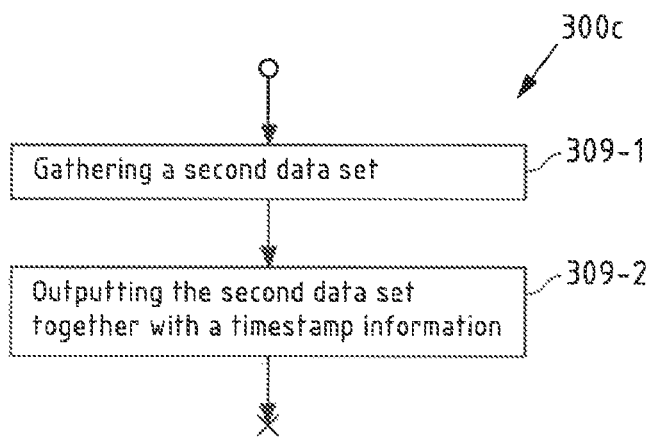

FIG. 3c is a flowchart 300c showing an example embodiment of a method according to the first exemplary aspect of the present invention. This flowchart 300c may for instance be performed by a mobile device, e.g. a mobile terminal. This flowchart 300c may for instance be performed by at least one of the mobile devices 2-1 to 2-3 of FIG. 1. The flowchart 300c may for instance be performed in addition to the flowchart 300a of FIG. 3a, and optionally in addition to flowchart 300b of FIG. 3b. Any of the further steps 309-1 and 309-2 may for instance be performed in parallel or after any of the steps 301 to 308 of the flowcharts 300a of FIGS. 3a and 300b of FIG. 3b.

In a step 309-1, a second data set is gathered. The second data set may for instance be gathered by measuring the second data set, e.g. with sensor(s) 570 in case flowchart 300c is performed and/or controlled by apparatus 500 of FIG. 5.

In a step 309-2, the second data set is output together with a timestamp information. The mobile device may for instance determine the timestamp information to represent a current date and/or time at which the second data set was gathered (see step 309-1). Then, the second data set may for instance be output together with the timestamp information, e.g. by sending the second data and the timestamp information to a server or a server cloud, e.g. server 3 of FIG. 1 performing and/or controlling the flowchart 200 of FIG. 2.

In particular, flowchart 200 of FIG. 2 and flowchart 300a of FIG. 3a, and optionally flowcharts 300b and/or 300c of FIGS. 3b and 3c are performed and/or controlled together, e.g. in real-time.

Figure 4:
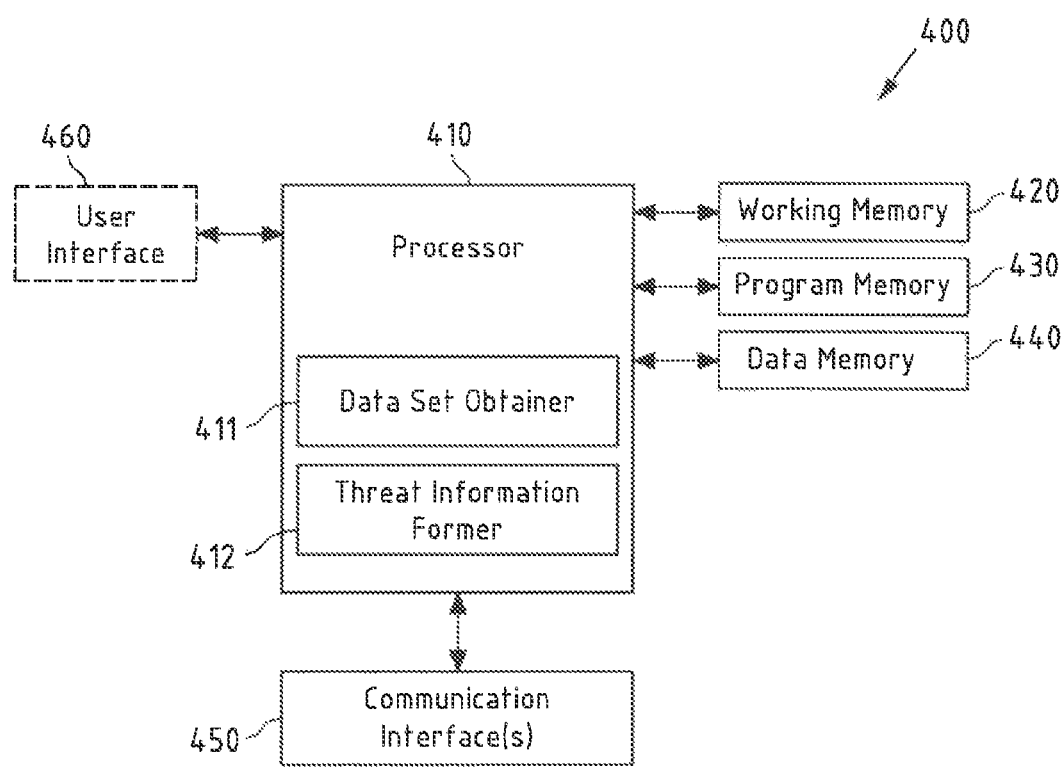
FIG. 4 is a block diagram of an exemplary embodiment of an apparatus according to the second exemplary aspect of the present invention.

FIG. 4 is a schematic block diagram of an apparatus 400 according to an exemplary aspect of the present invention, which may for instance represent the server 3 of FIG. 1. Apparatus 400 may for instance be configured to perform and/or control the method according to the second exemplary aspect of the present invention.

Apparatus 400 comprises a processor 410, working memory 420, program memory 430, data memory 440, communication interface(s) 450, and an optional user interface 460.

Apparatus 400 may for instance be configured to perform and/or control or comprise respective means (at least one of 410 to 460) for performing and/or controlling the method according to the second exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the second exemplary aspect of the invention of the present invention.

Processor 410 may for instance comprise data set obtainer 411 as a functional and/or structural unit. Data set obtainer 411 may for instance be configured to obtain one or more pieces of data sets (see step 201 of FIG. 2).

Processor 410 may for instance comprise threat information former 412 as a functional and/or structural unit. Threat information former 412 may for instance be configured to form one or more pieces of threat information (see step 202 of FIG. 2).

Processor 410 may for instance further control the memories 420 to 440, the communication interface(s) 450, and the optional user interface 460.

Processor 410 may for instance execute computer program code stored in program memory 430, which may for instance represent a computer readable storage medium comprising program code that, when executed by processor 410, causes the processor 410 to perform the method according to the second exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of data sets, one or more pieces of threat information, or a combination thereof, to name but a few non-limiting examples.

Communication interface(s) 450 enable apparatus 400 to communicate with other entities, e.g. with at least one of the mobile devices 2-1 to 2-3, and/or with at least one of the radio nodes 4-1 to 4-5, 5 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Some or all of the components of the apparatus 400 may for instance be connected via a bus. Some or all of the components of the apparatus 400 may for instance be combined into one or more modules.

Figure 5:
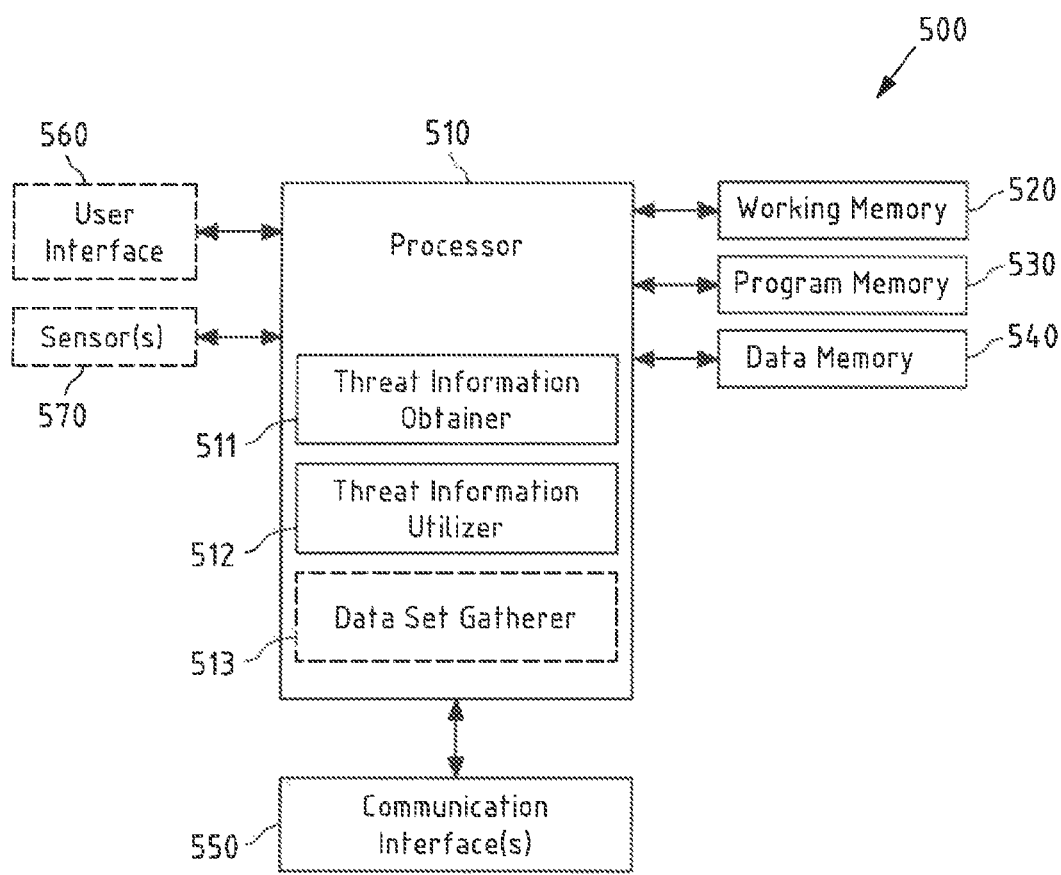
FIG. 5 is a block diagram of an exemplary embodiment of an apparatus according to the first exemplary aspect of the present invention.

FIG. 5 is a schematic block diagram of an apparatus 500 according to an exemplary aspect of the present invention, which may for instance represent at least one of the mobile devices 2-1 to 2-3 of FIG. 1. Apparatus 500 may for instance be configured to perform and/or control the method according to the first exemplary aspect of the present invention.

Apparatus 500 comprises a processor 510, working memory 520, program memory 530, data memory 540, communication interface(s) 550, and an optional user interface 560 and an optional sensor(s) 570.

Apparatus 500 may for instance be configured to perform and/or control or comprise respective means (at least one of 510 to 570) for performing and/or controlling the method according to the first exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the first exemplary aspect of the invention of the present invention.

Processor 510 may for instance comprise a threat information obtainer 511 as a functional and/or structural unit. Threat information obtainer 511 may for instance be configured to obtain one or more pieces of threat information (see step 301 of FIG. 3a).

Processor 510 may for instance comprise a threat information utilizer 512 as a functional and/or structural unit. Threat information utilizer 512 may for instance be configured to utilize one or more pieces of threat information in a positioning (see step 303 of FIG. 3a).

Threat information utilizer 512 may for instance be further configured to check a timestamp information (see step 304 of FIG. 3b), check a position (see step 305 of FIG. 3b), check a capability information (see step 306 of FIG. 3b), determine at least one affected radio node (see step 307 of FIG. 3b), block at least one affected radio node from being utilized in a positioning (see step 308 of FIG. 3b), or a combination thereof, to name but a few non-limiting examples.

Processor 510 may for instance comprise an optional data set gatherer 513 as a functional and/or structural unit. Data set gatherer 513 may for instance be configured to gather at least one data set (e.g. a second data set) (see step 309-1 of FIG. 3c).

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more pieces of threat information, one or more pieces of timestamp information, one or more positions, one or more position estimates, one or more affected radio node (e.g. one or more identifiers of such one or more affected radio node), one or more data sets, or a combination thereof, to name but a few non-limiting examples.

Communication interface(s) 550 enable apparatus 500 to communicate with other entities, e.g. with server 3 of FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 500 to communicate with other entities, for instance with radio nodes 4-1 to 4-5, and/or 5 of FIG. 1.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a barometric sensor, e.g. to gather pressure information.

Some or all of the components of the apparatus 500 may for instance be connected via a bus. Some or all of the components of the apparatus 500 may for instance be combined into one or more modules.

Figure 6:
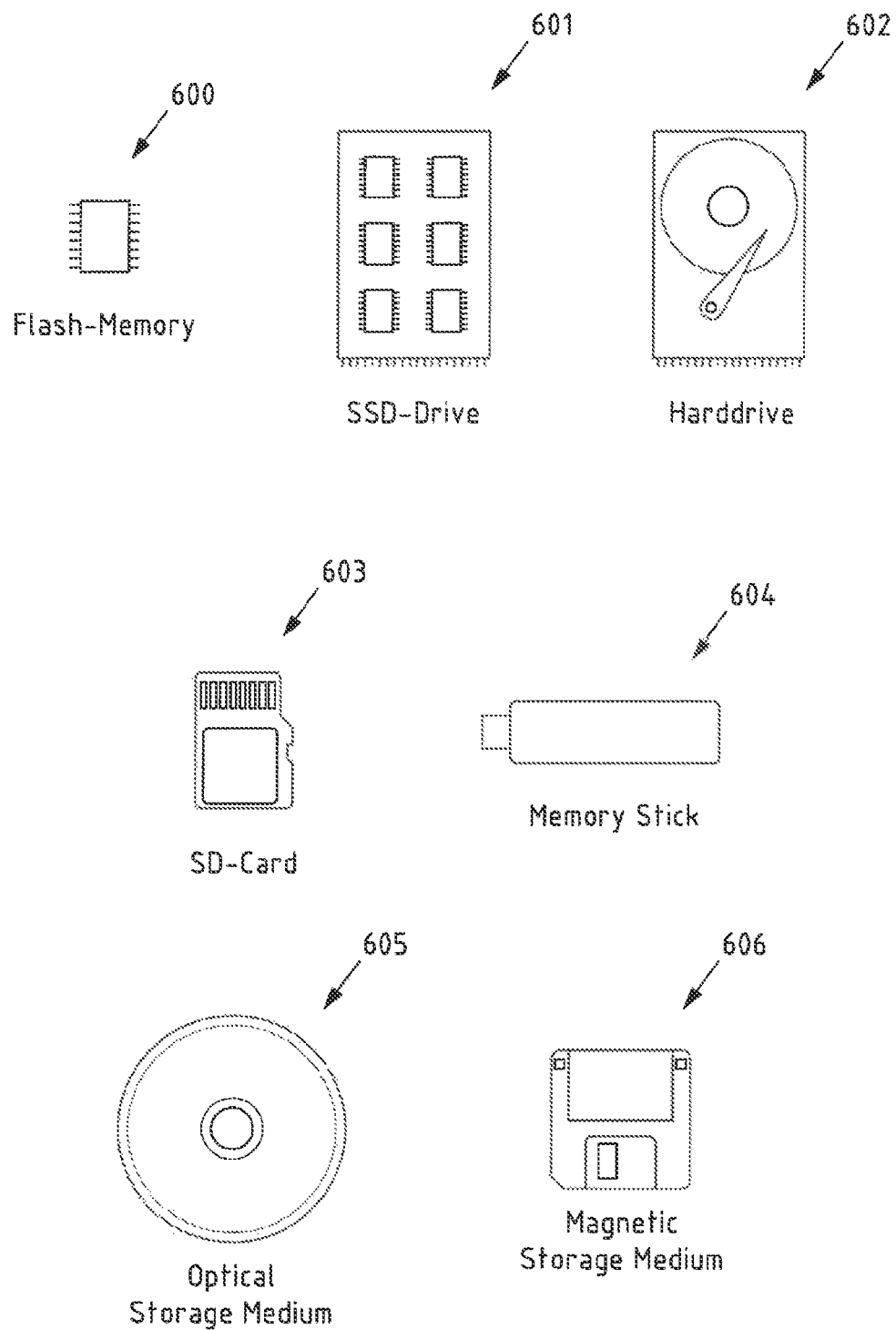
FIG. 6 is a schematic illustration of examples of tangible and non-transitory storage media according to the present invention.

FIG. 6 is a schematic illustration of examples of tangible and non-transitory computer-readable storage media according to the present invention that may for instance be used to implement one or more of the memories 420, 430 of FIG. 4 and/or memories 520, 530 of FIG. 5. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
  (a) hardware-only circuit implementations (such as implementations in only analog and/or digital circuitry)
  (b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 310 of FIG. 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

The following embodiments shall also be considered to be disclosed:

A client-side implementation that uses the real-time information to take appropriate actions may for instance be required to be performed and/or controlled as well.

The need for real-time services is well-known in the context of GNSS-based positioning. Therein, real-time integrity (RTI) services provide practically real-time notifications/alerts, if a satellite or a satellite signal is suspected to be faulty (e.g. due to hardware malfunction in the satellite).

Spoofing/jamming/meaconing threats necessitate similar services not only for network-based positioning, but also for GNSS-based positioning.

When it comes to threats, some of them are sustained, longer lasting and then e.g. a mechanism of keeping a database (e.g. locally at the device(s), and/or at a positioning server, to name but a few non-limiting examples) may for instance be considered to be an optimal approach. However, some threats are sporadic, short term and almost random in nature. In such a case, alerts must be pushed in real-time to the needing devices. Alternatively, there may be an API that exposes the same information and the devices poll the API for updates.

No matter whether the information is pulled or pushed, the service interface must support a few key features:

The alerts must be relevant to the device location—spoofing/jamming/meaconing are typically very local in nature and, thus, a specific device is only interested in its neighborhood;

The alerts must be relevant to the device capabilities—for example, a device that does not have GNSS capabilities is not interested in the GNSS-related alerts;

The alerts must be timely—historical information is of no use for the devices in the filed (though it may have use for e.g. statistical analysis purposes).

In this way, highly dynamic response to the spoofing/jamming/meaconing attempts may for instance be enabled.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A first method, performed by at least one mobile device, comprising:

obtaining one or more pieces of threat information indicative of a data set enabling positioning based on radio signals sent by a respective radio node, the one or more pieces of threat information (a) identifying the respective radio node, (b) indicating one or more of (i) a node radio type of the respective radio node or (ii) a node frequency-band of the respective radio node, and (c) comprising respective timestamp information, and wherein the data set is further indicative of one or more parameters based on which said positioning is performed and/or controlled and which is considered to be at least partially unexpected;

comparing the respective timestamp information associated with respective threat information of the one or more pieces of threat information to at least one other respective timestamp information associated with another respective threat information of the one or more pieces of threat information;

based on a result of the comparing, selecting at least one most recent piece of threat information from the one or more pieces of threat information; and utilizing the at least one most recent piece of threat information of the one or more pieces of threat information in performing said positioning, the at least one most recent piece of threat information comprising respective timestamp information indicating the at least one most recent piece of threat information is real-time information with respect to said positioning, wherein the obtaining of the one or more pieces of threat information is at least one of:
  obtaining the one or more pieces of threat information by using an application programming interface; or
  obtaining the one or more pieces of threat information by using a push method.

2. The first method according to claim 1, wherein the one or more parameters comprise or represent one or more of:
  i) radio-type information indicative of at least one radio type that is considered to be potentially manipulated;
  ii) frequency-band information indicative of at least one frequency-band that is considered to be potentially manipulated;
  iii) an identifier of at least one radio node enabling positioning that is considered to be potentially manipulated;
  iv) influencing information indicative of a certain type of influence that is considered to be potentially manipulated and/or if certain type of influence is continuous or sporadic or periodic; or
  v) detection information indicative of whether or not detection of manipulation is reliable or uncertain.

3. The first method according to claim 1, wherein a respective threat information of the one or more pieces of threat information is indicative of at least one of spoofing, jamming, or meaconing threats to the positioning.

4. The first method according to claim 1, further comprising:
  determining at least one affected radio node based on the one or more pieces of threat information; and
  blocking the at least one affected radio node from being utilized in the positioning.

5. The first method according to claim 1, further comprising checking timestamp information by:
  checking a position of the at least one mobile device with a location associated with a respective parameter of the one or more parameters, wherein respective pieces of the one or more pieces of threat information that are associated with the position of the at least one mobile device are utilized in the positioning; and/or
  checking a capability information indicative of at least one capability utilized in the positioning, and that is associated with a respective threat information of the one or more pieces of threat information with certain capabilities of the at least one mobile device, wherein a respective piece of threat information of the one or more pieces of threat information, that is relevant considering the certain capabilities of the at least one mobile device, is utilized in the positioning.

6. The first method according to claim 5, wherein the certain capabilities of the at least one mobile device are indicative of one or more of:
  i) radio-type capabilities of the at least one mobile device; or
  ii) frequency-band capabilities of the at least one mobile device.

7. The first method according to claim 1, wherein the positioning is a global navigation satellite system (GNSS) and/or a non-GNSS positioning, wherein the non-GNSS positioning is at least one of:
  a radio-network based positioning; or
  a sensor-based positioning.

8. The first method according to claim 1, wherein the data set further comprises a position information indicative of a position of at least one radio node enabling positioning that is considered to be potentially unexpected, or wherein the position information is determined based on identification information of at least one radio node enabling positioning that is considered to be potentially manipulated.

9. The first method according to claim 1, further comprising:
  gathering a second data set based on radio signals of one or more radio nodes enabling positioning; and
  outputting the second data set together with a timestamp information indicative of a time and/or date at which the second data set was gathered.

10. The method according to claim 1, further comprising replacing at least one outdated piece of threat information with a respective threat information.

11. The method according to claim 1, further comprising polling the application programming interface, wherein the one or more pieces of threat information are obtained as a result of polling the application programming interface.

12. A second method, performed by at least one apparatus, comprising:
  obtaining one or more pieces of data sets, wherein each data set of the one or more pieces of data sets (a) enables positioning based on radio signals sent by a respective radio node, (b) is indicative of one or more parameters based on which said positioning is performed and/or controlled and which is considered to be at least partially unexpected, and (c) is associated with a timestamp information;
  forming said one or more pieces of data sets into one or more pieces of threat information, each of the one or more pieces of threat information (a) identifying the respective radio node and (b) indicating one or more of (i) a node radio type of the respective radio node or (ii) a node frequency-band of the respective radio node;
  filtering said one or more pieces of threat information based on (a) a position estimate of an intended recipient and (b) radio capabilities of said intended recipient; and
  providing the filtered one or more pieces of threat information by using an application programming interface, and/or by using a push method for receipt by said intended recipient;
  wherein the filtered one or more pieces of threat information are utilized by said intended recipient in performing said positioning.

13. The second method according to claim 12, wherein only a part of the one or more pieces of threat information is provided dependent upon a position, and/or upon one or more capabilities of a respective mobile device to which the part of the one or more pieces of threat information is provided.

14. The second method according to claim 12, wherein a respective data set of the one or more pieces of data sets is associated with a timestamp information indicative of a time and/or date at which the respective data set was gathered prior to the obtaining of said respective data set.

15. The second method according to claim 12, wherein the one or more parameters comprise or represent one or more of:
   i) radio-type information indicative of at least one radio type that is considered to be potentially manipulated;
   ii) frequency-band information indicative of at least one frequency-band that is considered to be potentially manipulated;
   iii) an identifier of at least one radio node enabling positioning that is considered to be potentially manipulated;
   iv) influencing information indicative of a certain type of influence that is considered to be potentially manipulated and/or if certain type of influence is continuous or sporadic; or
   v) detection information indicative of whether or not detection of manipulation is reliable or uncertain.

16. An apparatus comprising at least one processor and at least one memory including computer program code, the at least one memory and the computer program code configured to, with the at least one processor, cause the apparatus at least to:
   obtain one or more pieces of threat information indicative of a data set enabling positioning based on radio signals sent by a respective radio node, the one or more pieces of threat information (a) identifying the respective radio node, (b) indicating one or more of (i) a node radio type of the respective radio node or (ii) a node frequency-band of the respective radio node, and (c) comprising respective timestamp information, and wherein the data set is further indicative of one or more parameters based on which said positioning is performed and/or controlled and which is considered to be at least partially unexpected;
   compare the respective timestamp information associated with respective threat information of the one or more pieces of threat information to at least one other respective timestamp information associated with another respective threat information of the one or more pieces of threat information;
   based on a result of the comparing, selecting at least one most recent piece of threat information from the one or more pieces of threat information; and
   utilize the at least one most recent piece of threat information of the one or more pieces of threat information in performing said positioning, the at least one most recent piece of threat information comprising respective timestamp information indicating the at least one most recent piece of threat information is real-time information with respect to said positioning,
   wherein the at least one memory and the computer program code are configured to, with the at least one processor, cause the apparatus to obtain the one or more pieces of threat information by at least one of:
      obtaining the one or more pieces of threat information by using an application programming interface; or
      obtaining the one or more pieces of threat information by using a push method.

17. The apparatus according to claim 16, wherein the at least one memory and the computer program code are further configured to, with the at least one processor, cause the apparatus to:
   determine at least one affected radio node based on the one or more pieces of threat information; and
   block the at least one affected radio node from being utilized in the positioning.

18. The apparatus according to claim 16, wherein the at least one memory and the computer program code are further configured to, with the at least one processor, cause the apparatus to check timestamp information by:
   checking a position of at least one mobile device with a location associated with a respective parameter of the one or more parameters, wherein respective pieces of the one or more pieces of threat information that are associated with the position of the at least one mobile device are utilized in the positioning; and/or
   checking a capability information indicative of at least one capability utilized in the positioning, and that is associated with a respective threat information of the one or more pieces of threat information with certain capabilities of the at least one mobile device, wherein a respective piece of threat information of the one or more pieces of threat information, that is relevant considering the certain capabilities of the at least one mobile device, is utilized in the positioning.

19. The apparatus according to claim 16, wherein the data set further comprises a position information indicative of a position of at least one radio node enabling positioning that is considered to be potentially unexpected, or wherein the position information is determined based on identification information of at least one radio node enabling positioning that is considered to be potentially manipulated.

20. The apparatus according to claim 16, wherein the at least one memory and the computer program code are further configured to, with the at least one processor, cause the apparatus to:
   gather a second data set based on radio signals of one or more radio nodes enabling positioning; and
   output the second data set together with a timestamp information indicative of a time and/or date at which the second data set was gathered.

* * * * *